United States Patent
Kataoka

(10) Patent No.: US 12,027,186 B2
(45) Date of Patent: Jul. 2, 2024

(54) NONCONTACT COMMUNICATION DEVICE, MAGNETIC TAPE DRIVE, NONCONTACT COMMUNICATION SYSTEM, METHOD FOR OPERATING NONCONTACT COMMUNICATION DEVICE, AND PROGRAM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/173,783

(22) Filed: Feb. 24, 2023

(65) Prior Publication Data
US 2023/0197107 A1 Jun. 22, 2023

Related U.S. Application Data

(63) Continuation of application No. PCT/JP2021/028991, filed on Aug. 4, 2021.

(30) Foreign Application Priority Data
Sep. 28, 2020 (JP) ................. 2020-162675

(51) Int. Cl.
*G11B 5/00* (2006.01)
*G11B 5/008* (2006.01)
*G11B 15/67* (2006.01)

(52) U.S. Cl.
CPC .......... *G11B 5/00813* (2013.01); *G11B 15/67* (2013.01)

(58) Field of Classification Search
CPC ......... G11B 5/78; G11B 15/68; G11B 23/107; G11B 23/30; G11B 25/06; G11B 5/00;
(Continued)

(56) References Cited

U.S. PATENT DOCUMENTS 7,933,553 B2 * 4/2011 Kientz ............... G06K 19/0726
455/150.1
11,551,715 B2 * 1/2023 Tochikubo ............. G06K 19/07
(Continued)

FOREIGN PATENT DOCUMENTS

| JP | H09-8714 A | 1/1997 |
| JP | H10-199067 A | 7/1998 |

(Continued)

OTHER PUBLICATIONS

International Search Report issued in International Application No. PCT/JP2021/028991 on Oct. 26, 2021.
(Continued)

*Primary Examiner* — Nabil Z Hindi
(74) *Attorney, Agent, or Firm* — SOLARIS Intellectual Property Group, PLLC

(57) ABSTRACT

A noncontact communication device includes a processor, and a transmission and reception device that applies a magnetic field to a noncontact storage medium mounted in a magnetic tape cartridge to induce power in the noncontact storage medium and is coupled to the noncontact storage medium by electromagnetic induction to perform transmission and reception of information with the noncontact storage medium. The noncontact storage medium has a measurement circuit that measures the power, and transmits power information regarding the power measured by the measurement circuit to the noncontact communication device. The transmission and reception device receives the power information, and the processor is configured to execute support processing of supporting the transmission and reception based on the power information received by the transmission and reception device.

18 Claims, 30 Drawing Sheets

(58) Field of Classification Search
CPC ............. G06K 19/07; G06K 19/07779; G06K 19/0726; G06K 19/07775
USPC .................................................. 360/77.12, 1
See application file for complete search history.

(56) References Cited

U.S. PATENT DOCUMENTS

2009/0146809 A1    6/2009  Kientz
2009/0273454 A1*  11/2009  Onozuka ............. G06K 7/0008
                                                                     340/10.51
2021/0012174 A1    1/2021  Ono et al.

FOREIGN PATENT DOCUMENTS

| JP | 2003-008481 A | | 1/2003 | |
|----|---------------|---|--------|---|
| JP | 2003008481 | * | 1/2003 | ............. G06K 17/00 |
| JP | 2010-026756 A | | 2/2010 | |
| WO | 2019/198438 A1 | | 10/2019 | |

OTHER PUBLICATIONS

Written Opinion of the ISA issued in International Application No. PCT/JP2021/028991 on Oct. 26, 2021.
English language translation of the following: Office action dated Aug. 29, 2023 from the JPO in a Japanese patent application No. 2020-162675 corresponding to the instant patent application.

* cited by examiner

NONCONTACT COMMUNICATION DEVICE, MAGNETIC TAPE DRIVE, NONCONTACT COMMUNICATION SYSTEM, METHOD FOR OPERATING NONCONTACT COMMUNICATION DEVICE, AND PROGRAM

CROSS-REFERENCE TO RELATED APPLICATIONS

This application is a continuation application of International Application No. PCT/JP2021/028991, filed on Aug. 4, 2021, the disclosure of which is incorporated herein by reference in its entirety. Further, this application claims priority from Japanese Patent Application No. 2020-162675, filed on Sep. 28, 2020, the disclosure of which is incorporated herein by reference in its entirety.

BACKGROUND

1. Technical Field

A technique of the present disclosure relates to a noncontact communication device, a magnetic tape drive, a noncontact communication system, a method for operating a noncontact communication device, and a program.

2. Related Art

JP1997-008714A (JP-H09-008714A) discloses a technique in which a fixed machine and response equipment are coupled by electromagnetic induction, so that power is supplied to a responder side, and tape information is transmitted and received between the fixed machine and the response equipment.

JP1998-199067A (JP-H10-199067A) discloses a video cassette tape processing apparatus. In the video cassette tape processing apparatus, an apparatus-side antenna is connected to a read/write module, and supply and control of power are performed by the read/write module with respect to an IC of a cassette label attached to a video cassette tape. The read/write module is further connected to a signal processing unit on a VTR apparatus side and is controlled from the VTR apparatus side.

SUMMARY

An embodiment according to the technique of the present disclosure provides a noncontact communication device, a magnetic tape drive, a noncontact communication system, a method for operating a noncontact communication device, and a program capable of stably contributing to transmission and reception of information with a noncontact storage medium.

A first aspect according to the technique of the present disclosure is a noncontact communication device comprising a processor, and a transmission and reception device that applies a magnetic field to a noncontact storage medium mounted in a magnetic tape cartridge to induce power in the noncontact storage medium and is coupled to the noncontact storage medium by electromagnetic induction to perform transmission and reception of information with the noncontact storage medium, in which the noncontact storage medium has a measurement circuit that measures the power, and transmits power information regarding the power measured by the measurement circuit to the noncontact communication device, the transmission and reception device receives the power information, and the processor is configured to execute support processing of supporting the transmission and reception based on the power information received by the transmission and reception device.

A second aspect according to the technique of the present disclosure is the noncontact communication device according to the first aspect, in which the support processing is processing including condition setting processing of satisfying a predetermined state reaching condition for bringing a state of the power to a predetermined state based on the power information received by the transmission and reception device.

A third aspect according to the technique of the present disclosure is the noncontact communication device according to the second aspect, in which the predetermined state is a state in which operation of the noncontact storage medium is stable.

A fourth aspect according to the technique of the present disclosure is the noncontact communication device according to the second aspect or the third aspect, in which the predetermined state reaching condition is a condition that an intensity of the magnetic field is an intensity for bringing the state of the power to the predetermined state.

A fifth aspect according to the technique of the present disclosure is the noncontact communication device according to any one of the first aspect to the fourth aspect, in which the support processing is processing including magnetic field intensity control processing of controlling an intensity of the magnetic field based on the power information received by the transmission and reception device.

A sixth aspect according to the technique of the present disclosure is the noncontact communication device according to the fifth aspect, in which the magnetic field intensity control processing is processing of generating the magnetic field with an intensity higher than a predetermined intensity as the intensity of the magnetic field applied to the noncontact storage medium.

A seventh aspect according to the technique of the present disclosure is the noncontact communication device according to the sixth aspect, in which the magnetic field intensity control processing is processing of changing the intensity of the magnetic field to a specific intensity in a state in which the magnetic field is generated with the intensity higher than the predetermined intensity to establish communication between the noncontact communication device and the noncontact storage medium.

An eighth aspect according to the technique of the present disclosure is the noncontact communication device according to the seventh aspect, in which the processor is configured to set a parameter corresponding to the specific intensity to change the intensity of the magnetic field to the specific intensity.

A ninth aspect according to the technique of the present disclosure is the noncontact communication device according to any one of the first aspect to the eighth aspect, in which the support processing is processing including presentation processing of causing a presentation device to present reference information based on the power information received by the transmission and reception device.

A tenth aspect according to the technique of the present disclosure is the noncontact communication device according to the ninth aspect, in which the reference information is information indicating a level of the power specified from the power information.

An eleventh aspect according to the technique of the present disclosure is the noncontact communication device according to any one of the first aspect to the tenth aspect, in which the power information is information indicating a tendency of fluctuation of the power within a predetermined period.

A twelfth aspect according to the technique of the present disclosure is the noncontact communication device according to any one of the first aspect to the eleventh aspect, in which the power information is information defined by dissimilarity from a relative value of the power or a reference value of the power.

A thirteenth aspect according to the technique of the present disclosure is the noncontact communication device according to any one of the first aspect to the twelfth aspect, in which the noncontact storage medium intermittently transmits the power information to the noncontact communication device, and the processor is configured to execute the support processing each time the power information is received by the transmission and reception device.

A fourteenth aspect according to the technique of the present disclosure is the noncontact communication device according to any one of the first aspect to the thirteenth aspect, in which the noncontact communication device is a reader/writer that performs reading and writing with respect to the noncontact storage medium.

A fifteenth aspect according to the technique of the present disclosure is the noncontact communication device according to any one of the first aspect to the fourteenth aspect, in which the support processing is processing including storage processing of storing information based on the power information in a storage device.

A sixteenth aspect according to the technique of the present disclosure is a magnetic tape drive comprising the noncontact communication device according to any one of the first aspect to the fifteenth aspect, and a magnetic head, in which the noncontact storage medium is mounted in a magnetic tape cartridge, the magnetic tape cartridge accommodates a magnetic tape, and the magnetic head performs at least one of recording or reading of data with respect to the magnetic tape pulled out from the magnetic tape cartridge.

A seventeenth aspect according to the technique of the present disclosure is a noncontact communication system comprising the noncontact communication device according to any one of the first aspect to the fifteenth aspect, and the noncontact storage medium.

An eighteenth aspect according to the technique of the present disclosure is a method for operating a noncontact communication device that applies a magnetic field to a noncontact storage medium to induce power in the noncontact storage medium and is coupled to the noncontact storage medium by electromagnetic induction to perform transmission and reception of information with the noncontact storage medium, the noncontact storage medium having a measurement circuit that measures power, and transmitting power information regarding the power measured by the measurement circuit to the noncontact communication device, the method comprising receiving the power information, and executing support processing of supporting the transmission and reception based on the received power information.

A nineteenth aspect according to the technique of the present disclosure is a program causing a computer, which is applied to a noncontact communication device that applies a magnetic field to a noncontact storage medium to induce power in the noncontact storage medium and is coupled to the noncontact storage medium by electromagnetic induction to perform transmission and reception of information with the noncontact storage medium, to execute specific processing, the noncontact storage medium having a measurement circuit that measures power, and transmitting power information regarding the power measured by the measurement circuit to the noncontact communication device, the specific processing comprising receiving the power information, and executing support processing of supporting the transmission and reception based on the received power information.

BRIEF DESCRIPTION OF THE DRAWINGS

Exemplary embodiments of the technology of the disclosure will be described in detail based on the following figures, wherein.

DETAILED DESCRIPTION

Hereinafter, an example of an embodiment of a noncontact communication device, a magnetic tape drive, a noncontact communication system, a method for operating a noncontact communication device, and a program according to the technique of the present disclosure will be described referring to the accompanying drawings.

First, terms that are used in the following description will be described.

CPU is an abbreviation for "Central Processing Unit". RAM is an abbreviation for "Random Access Memory". DRAM is an abbreviation for "Dynamic Random Access Memory". SRAM is an abbreviation for "Static Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". IBM is an abbreviation for "International Business Machines Corporation". CM is an abbreviation for "Cartridge Memory". EL is an abbreviation for "Electro-Luminescence".

Figure 1:
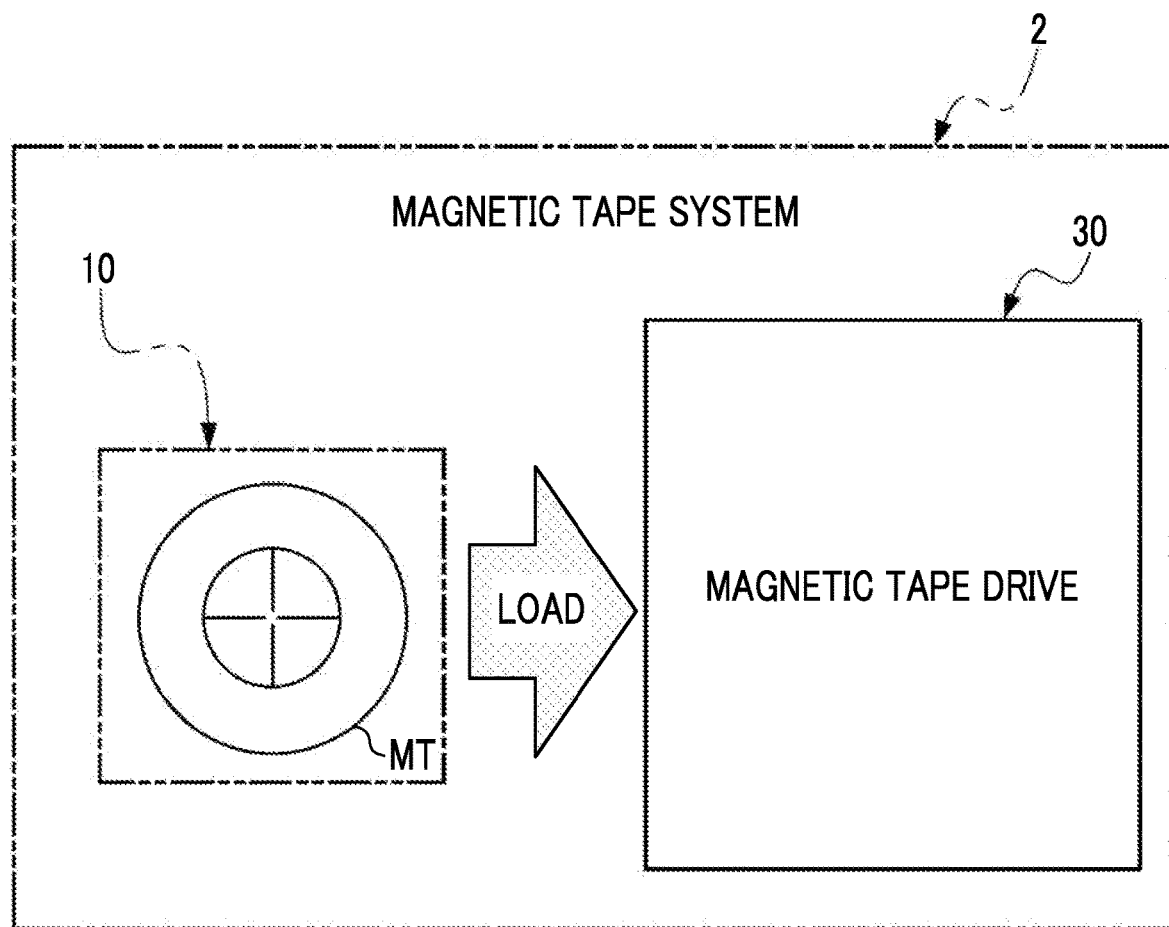
FIG. 1 is a block diagram showing an example of the configuration of a magnetic tape system.

As shown in FIG. 1 as an example, a magnetic tape system 2 is an example of a "noncontact communication system" according to the technique of the present disclosure, and comprises a magnetic tape cartridge 10 and a magnetic tape drive 30. The magnetic tape cartridge 10 is loaded into the magnetic tape drive 30. The magnetic tape cartridge 10 accommodates the magnetic tape MT. The magnetic tape drive 30 pulls out the magnetic tape MT from the magnetic tape cartridge 10 loaded thereinto, and records data on the magnetic tape MT or reads data from the magnetic tape MT while making the pulled-out magnetic tape MT run.

Next, an example of the configuration of the magnetic tape cartridge 10 will be described referring to FIGS. 2 to 4. In the following description, for convenience of description, in FIGS. 2 to 4, a loading direction of the magnetic tape cartridge 10 into the magnetic tape drive 30 (see FIG. 5) is indicated by an arrow A, a direction of the arrow A is referred to as a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In the following description, for convenience of description, in FIGS. 2 to 4, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

In the following description, for convenience of description, in FIGS. 2 to 4, a direction opposite to the direction of the arrow B is referred to as a left direction, and a side in the left direction of the magnetic tape cartridge 10 is referred to as a left side of the magnetic tape cartridge 10. In the following description of the structure, "left" indicates the left side of the magnetic tape cartridge 10.

In the following description, for convenience of description, in FIGS. 2 to 4, a direction perpendicular to the direction of the arrow A and the direction of the arrow B is indicated by an arrow C, a direction of the arrow C is referred to as an up direction of the magnetic tape cartridge 10, and a side in the up direction of the magnetic tape cartridge 10 is referred to as an upside of the magnetic tape cartridge 10. In the following description of the structure, "up" indicates the upside of the magnetic tape cartridge 10.

In the following description, for convenience of description, in FIGS. 2 to 4, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

In the following description, for convenience of description, in FIGS. 2 to 4, a direction opposite to the up direction of the magnetic tape cartridge 10 is referred to as a down direction of the magnetic tape cartridge 10, and a side in the down direction of the magnetic tape cartridge 10 is referred to as a downside of the magnetic tape cartridge 10. In the following description of the structure, "down" indicates the downside of the magnetic tape cartridge 10.

In the following description, although LTO will be described as the specification of the magnetic tape cartridge 10 as an example, this is merely an example, and the specification of the magnetic tape cartridge 10 may conform to the specification of a magnetic tape cartridge of IBM3592.

Figure 2:
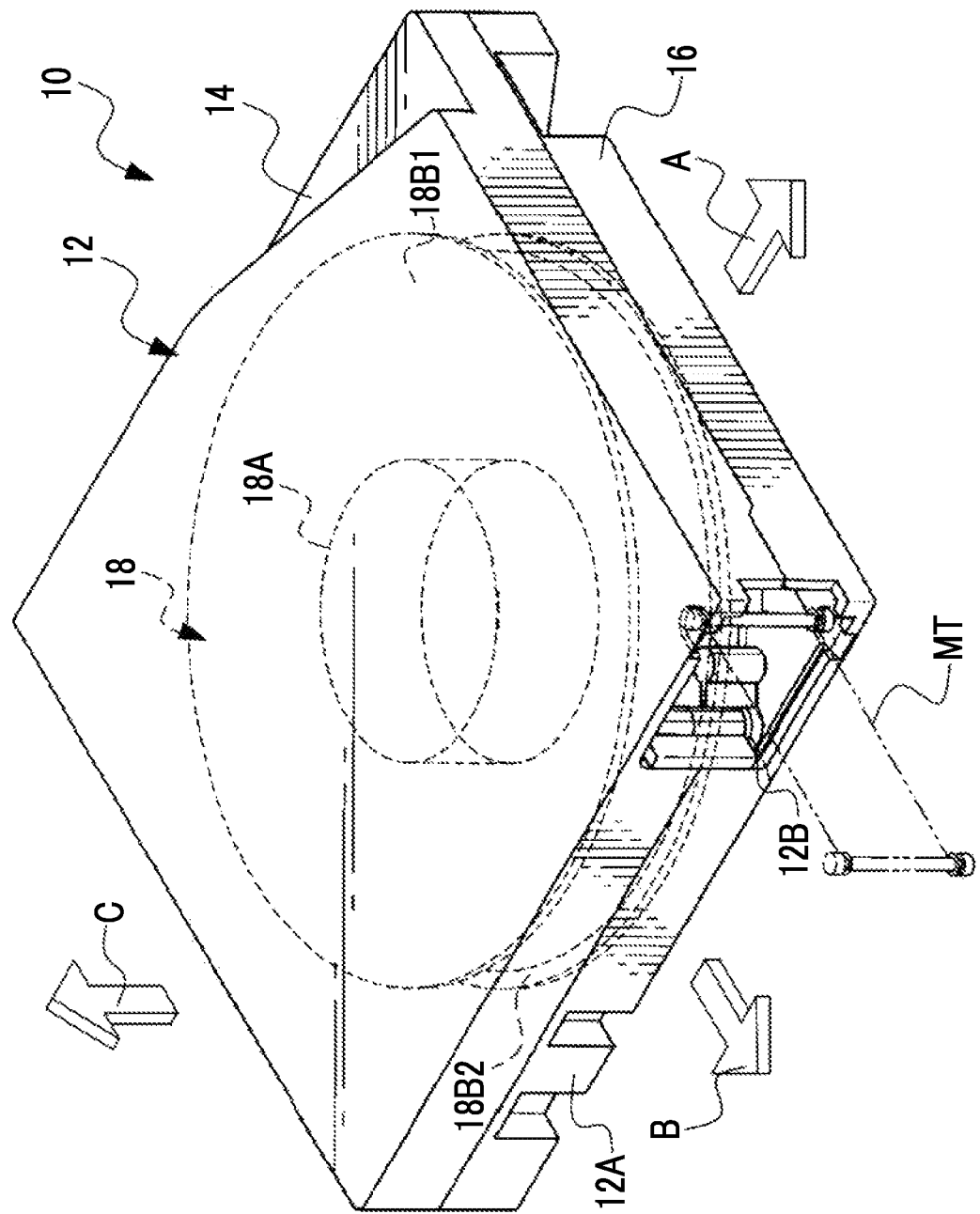
FIG. 2 is a schematic perspective view showing an example of the appearance of a magnetic tape cartridge.

As shown in FIG. 2 as an example, the magnetic tape cartridge 10 has a substantially rectangular shape in plan view, and comprises a box-shaped case 12. The case 12 is an example of a "case" according to the technique of the present disclosure. The magnetic tape MT is accommodated in the case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably accommodated. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. The reel hub 18A and the lower flange 18B2 may be molded integrally.

The magnetic tape MT is wound around an outer peripheral surface of the reel hub 18A, and an end portion in a width direction of the magnetic tape MT is held by the upper flange 18B1 and the lower flange 18B2.

An opening 12B is formed on a front side of a right wall 12A of the case 12. The magnetic tape MT is pulled out from the opening 12B.

Figure 3:
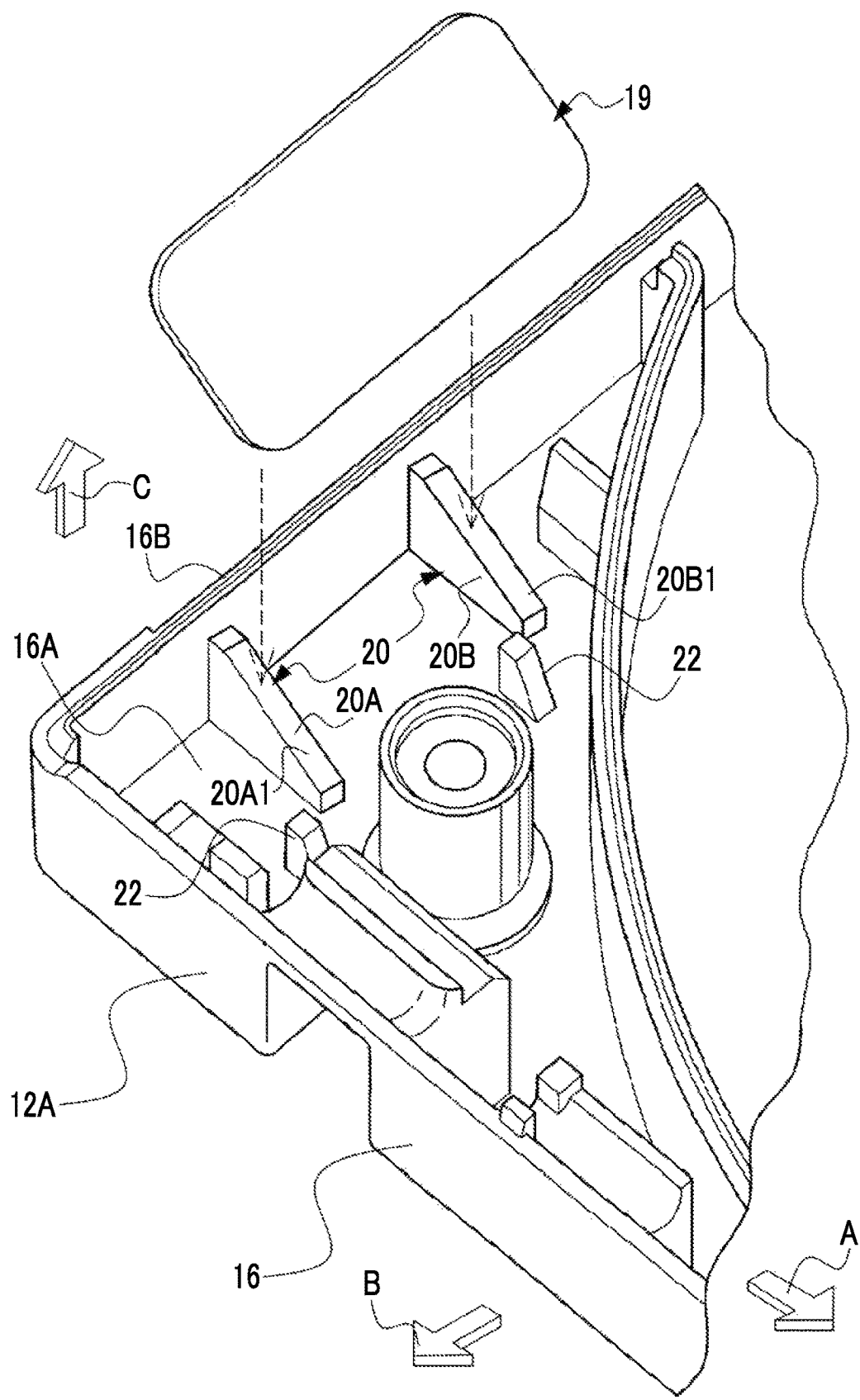
FIG. 3 is a schematic perspective view showing an example of the structure of a rear right end portion inside a lower case of the magnetic tape cartridge.

As shown in FIG. 3 as an example, a cartridge memory 19 is mounted in the magnetic tape cartridge 10. The cartridge memory 19 is provided in the lower case 16. More specifically, the cartridge memory 19 is accommodated in a rear right end portion of the lower case 16. The cartridge memory 19 is an example of a "noncontact communication medium" according to the technique of the present disclosure. In the present embodiment, a so-called passive type RFID tag is employed as the cartridge memory 19.

Information regarding the magnetic tape MT is stored in the cartridge memory 19. Information regarding the magnetic tape MT indicates, for example, management information 100 (see FIG. 12) for managing the magnetic tape cartridge 10. The management information includes, for example, information (for example, a CM identifier 106A described below) regarding the cartridge memory 19, information (for example, a cartridge identifier 106B) capable of specifying the magnetic tape cartridge 10, and information indicating a storage capacity of the magnetic tape MT and the outline of data, items of data, and a recording format of data, recorded on the magnetic tape MT.

The cartridge memory 19 performs noncontact communication with a noncontact reading and writing device. Examples of the noncontact reading and writing device include a noncontact reading and writing device (for example, a noncontact reading and writing device 50B shown in FIG. 30) that is used in a manufacturing process of the magnetic tape cartridge 10, and a noncontact reading and writing device (for example, the noncontact reading and writing device 50A shown in FIGS. 5 to 7, and the like) that is used in a magnetic tape drive (for example, the magnetic tape drive 30 shown in FIG. 5). The noncontact reading and writing device operates using power supplied from a battery (not shown) or a commercial power supply.

The noncontact reading and writing device is a device that is generally referred to as a reader/writer, and performs reading and writing of various kinds of information with respect to the cartridge memory 19 in a noncontact manner. Though details will be described below, the cartridge memory 19 generates power with electromagnetic application of the magnetic field MF (see FIG. 6 and the like) from the noncontact reading and writing device. Then, the cartridge memory 19 operates using the generated power and performs communication with the noncontact reading and writing device through the magnetic field MF to perform transfer of various kinds of information with the noncontact reading and writing device. A communication system may be, for example, a system conforming to a known standard, such as ISO14443 or ISO18092, or may be a system conforming to the LTO Specification of ECMA319.

As shown in FIG. 3 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. The second inclined mount 20B has an inclined surface 20B1, and the inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 4:
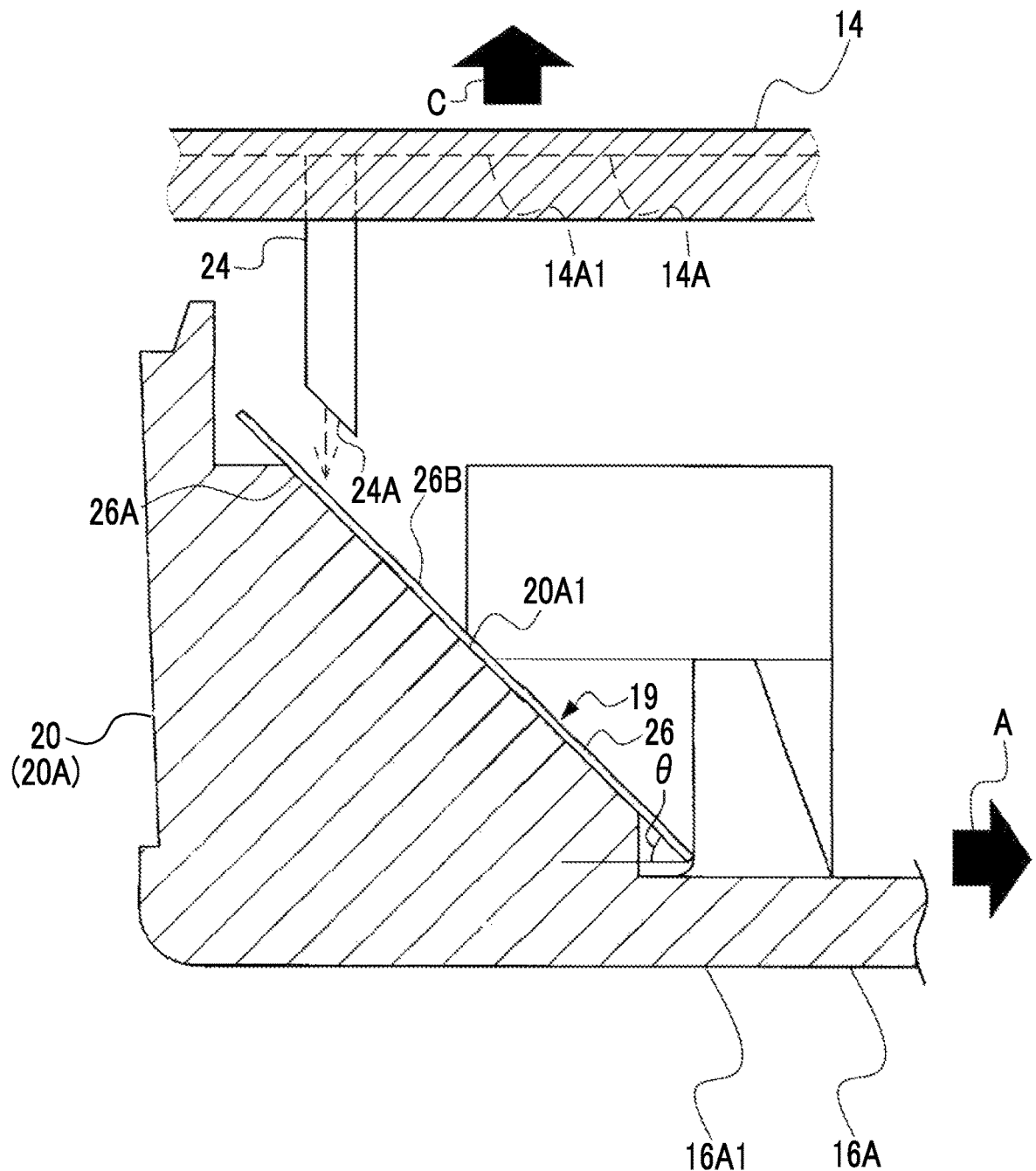
FIG. 4 is a side cross-sectional view showing an example of a support member provided on an inner surface of the lower case of the magnetic tape cartridge.

As shown in FIG. 4 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. Here, "parallel" indicates parallel in a meaning including an error that is generally allowed in the technical field to which the technique of the present disclosure belongs, and an error to such an extent not contrary to the spirit and scope of the technique of that the present disclosure, in addition to completely parallel. An inclination angle θ of the support member 20, that is, an inclination angle of each of the inclined surface 20A1 and the inclined surface 20B1 (see FIG. 3) is 45 degrees with respect to the reference surface 16A1. The inclination angle of 45 degrees is merely an example, and may be in a range of "0 degrees<inclination angle θ<45 degrees" or may be equal to or greater than 45 degrees.

The cartridge memory 19 comprises a substrate 26. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B1 (see FIG. 3), and a front surface 26B of the substrate 26 is exposed to an inner surface 14A1 side of a top plate 14A of the upper case 14.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1 (see FIG. 3). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 3) of the support member 20. With this, a position in an up-down direction of the cartridge memory 19 is restricted by the ribs 24.

Figure 5:
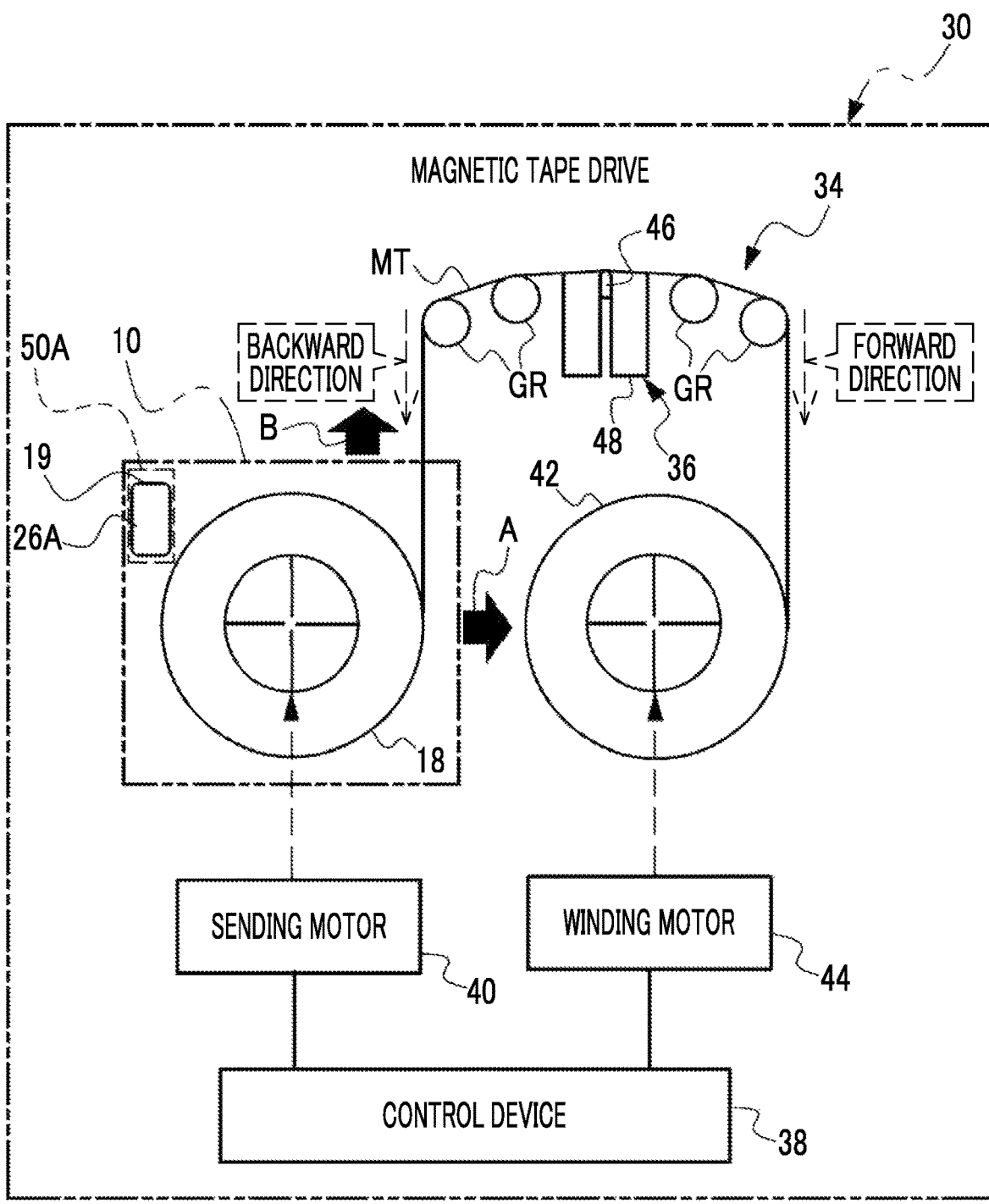
FIG. 5 is a schematic configuration diagram showing an example of the hardware configuration of a magnetic tape drive.

As shown in FIG. 5 as an example, the magnetic tape drive 30 comprises a transport device 34, a magnetic head 36, and a control device 38. The magnetic tape cartridge 10 is loaded into the magnetic tape drive 30. The magnetic tape drive 30 is a device that pulls out the magnetic tape MT from the magnetic tape cartridge 10, records data on the pulled-out magnetic tape MT using the magnetic head 36, and reads data from the pulled-out magnetic tape MT using the magnetic head 36 by a linear serpentine method. In the present embodiment, in other words, reading of data indicates reproduction of data.

The control device 38 controls the operation of the entire magnetic tape drive 30. In the present embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38. Here, the forward direction indicates a sending direction of the magnetic tape MT, and the backward direction indicates a rewinding direction of the magnetic tape MT.

The sending motor 40 rotates the cartridge reel 18 in the magnetic tape cartridge 10 under the control of the control device 38. The control device 38 controls the sending motor 40 to control a rotation direction, a rotation speed, rotation torque, and the like of the cartridge reel 18.

In a case where the magnetic tape MT is wound around the winding reel 42 (loaded), the control device 38 rotates the sending motor 40 such that the magnetic tape MT runs in the forward direction. A rotation speed, rotation torque, and the like of the sending motor 40 are adjusted depending on a speed of the magnetic tape MT wound around the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the control device 38 rotates the winding motor 44 such that the magnetic tape MT runs in the forward direction. In a case of rewinding (unloading) the magnetic tape MT to the cartridge reel 18, the control device 38 rotates the sending motor 40 and the winding motor 44 such that the magnetic tape MT runs in the backward direction. A rotation speed, rotation torque, and the like of the winding motor 44 are adjusted depending on the speed of the magnetic tape MT wound around the winding reel 42. The rotation speed, the rotation torque, and the like of each of the sending motor 40 and the winding motor 44 are adjusted by the control device 38 in this manner, whereby tension is applied to the magnetic tape MT.

In the present embodiment, although the rotation speed, the rotation torque, and the like of each of the sending motor 40 and the winding motor 44 are controlled such that the tension that is applied to the magnetic tape MT is controlled, the technique of the present disclosure is not limited thereto. For example, the tension that is applied to the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the magnetic head 36 between the magnetic tape cartridge 10 and the winding reel 42.

The magnetic head 36 comprises a magnetic element unit 46 and a holder 48. The magnetic element unit 46 is held by the holder 48 to come into contact with the magnetic tape MT during running. The magnetic element unit 46 records data on the magnetic tape MT transported by the transport device 34 or reads data from the magnetic tape MT transported by the transport device 34.

The magnetic tape drive 30 comprises a noncontact reading and writing device 50A. The noncontact reading and writing device 50A is an example of a "noncontact communication device" according to the technique of the present disclosure. The noncontact reading and writing device 50A is disposed to confront the back surface 26A of the cartridge memory 19 below the magnetic tape drive 30 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where reading of data from the magnetic tape MT by the magnetic head 36 starts.

Figure 6:
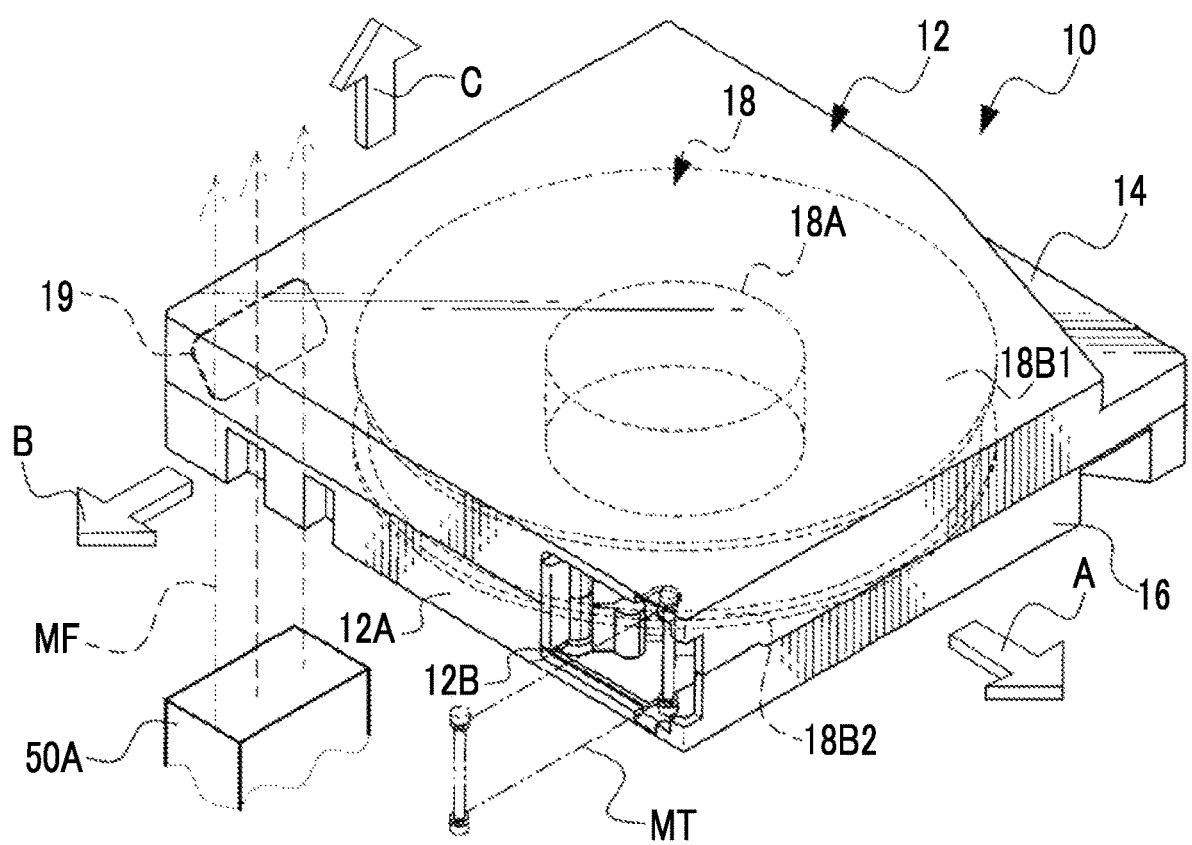
FIG. 6 is a schematic perspective view showing an example of an aspect in which a magnetic field is emitted from a lower side of the magnetic tape cartridge by a noncontact reading and writing device.

As shown in FIG. 6 as an example, the noncontact reading and writing device 50A emits a magnetic field MF from below the magnetic tape cartridge 10 toward the cartridge memory 19. The magnetic field MF passes through the cartridge memory 19.

Figure 7:
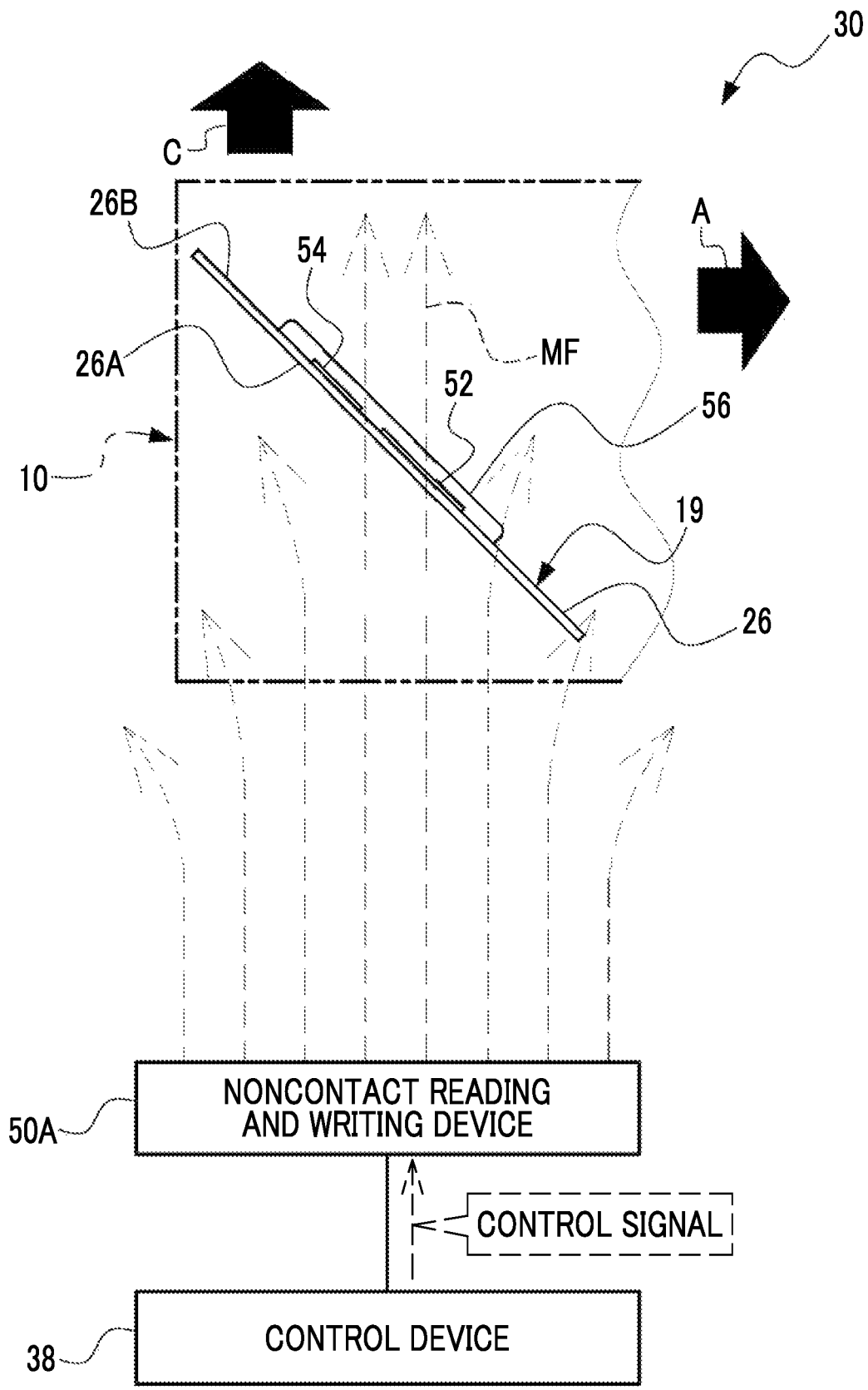
FIG. 7 is a conceptual diagram showing an example of an aspect in which a magnetic field is applied from the noncontact reading and writing device to a cartridge memory in the magnetic tape cartridge.

As shown in FIG. 7 as an example, the noncontact reading and writing device 50A is connected to the control device 38. The control device 38 outputs a control signal to the noncontact reading and writing device 50A. The control signal is a signal for controlling the cartridge memory 19. The noncontact reading and writing device 50A emits the magnetic field MF toward the cartridge memory 19 in response to the control signal input from the control device 38. The magnetic field MF passes through the cartridge memory 19 from the back surface 26A side to the front surface 26B side.

The noncontact reading and writing device 50A performs noncontact communication with the cartridge memory 19 to give a command depending on the control signal to the cartridge memory 19. In more detail, the noncontact reading and writing device 50A spatially transmits the command to the cartridge memory 19 under the control of the control device 38. Though details will be described below, the command is a signal indicating an order to the cartridge memory 19.

Here, although a form example where the noncontact reading and writing device 50A spatially transmits the command to the cartridge memory 19 under the control of the control device 38 has been described, the technique of the present disclosure is not limited thereto. For example, in a stage where the magnetic tape cartridge 10 is manufactured, a stage where the magnetic tape cartridge 10 is inspected, or a stage where the magnetic tape cartridge 10 is shipped, a noncontact reading and writing device 50B (see FIG. 30) spatially transmits the command to the cartridge memory 19 under the control of a control device different from the control device 38.

In a case where the command is spatially transmitted from the noncontact reading and writing device 50A to the cartridge memory 19, the command depending on an instruction from the control device 38 is included in the magnetic field MF by the noncontact reading and writing device 50A. In other words, the command is superimposed on the magnetic field MF by the noncontact reading and writing device 50A. That is, the noncontact reading and writing device 50A transmits the command to the cartridge memory 19 through the magnetic field MF under the control of the control device 38.

An IC chip 52 and a capacitor 54 are mounted on the front surface 26B of the cartridge memory 19. The IC chip 52 and the capacitor 54 are bonded to the front surface 26B. The IC chip 52 and the capacitor 54 are sealed with a sealing material 56 on the front surface 26B of the cartridge memory 19. Here, as the sealing material 56, ultraviolet curable resin that is cured upon reaction with ultraviolet rays is employed. The ultraviolet curable resin is merely an example, and photocurable resin that is cured upon reaction with light in a wavelength range other than ultraviolet rays may be used as the sealing material 56, thermosetting resin may be used as the sealing material 56, or other adhesives may be used as the sealing material 56.

Figure 8:
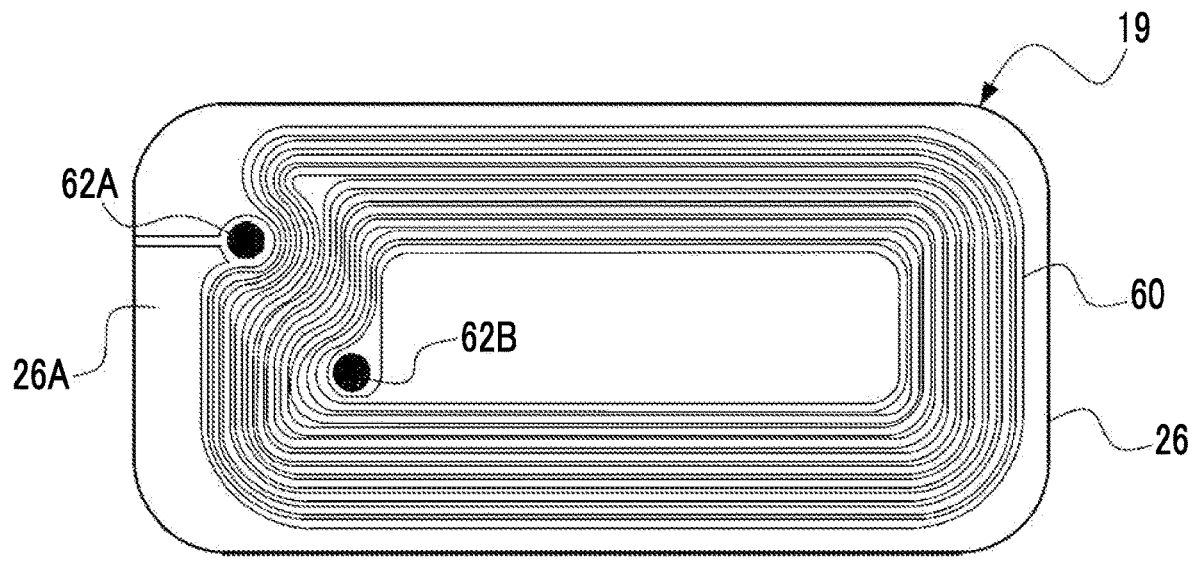
FIG. 8 is a schematic bottom view showing an example of the structure of a back surface of a substrate of the cartridge memory in the magnetic tape cartridge.

As shown in FIG. 8 as an example, an antenna coil 60 is formed in a loop shape on the back surface 26A of the cartridge memory 19. Here, as a material of the antenna coil 60, copper foil is employed. The copper foil is merely an example, and for example, other kinds of conductive materials, such as aluminum foil, may be used. The antenna coil 60 induces an induced current with application of the magnetic field MF (see FIGS. 6 and 7) from the noncontact reading and writing device 50A.

A first conduction portion 62A and a second conduction portion 62B are provided on the back surface 26A of the cartridge memory 19. The first conduction portion 62A and the second conduction portion 62B have solders and electrically connect both end portions of the antenna coil 60 to the IC chip 52 (see FIGS. 7 and 9) and the capacitor 54 (see FIGS. 7 and 9) on the front surface 26B.

Figure 9:
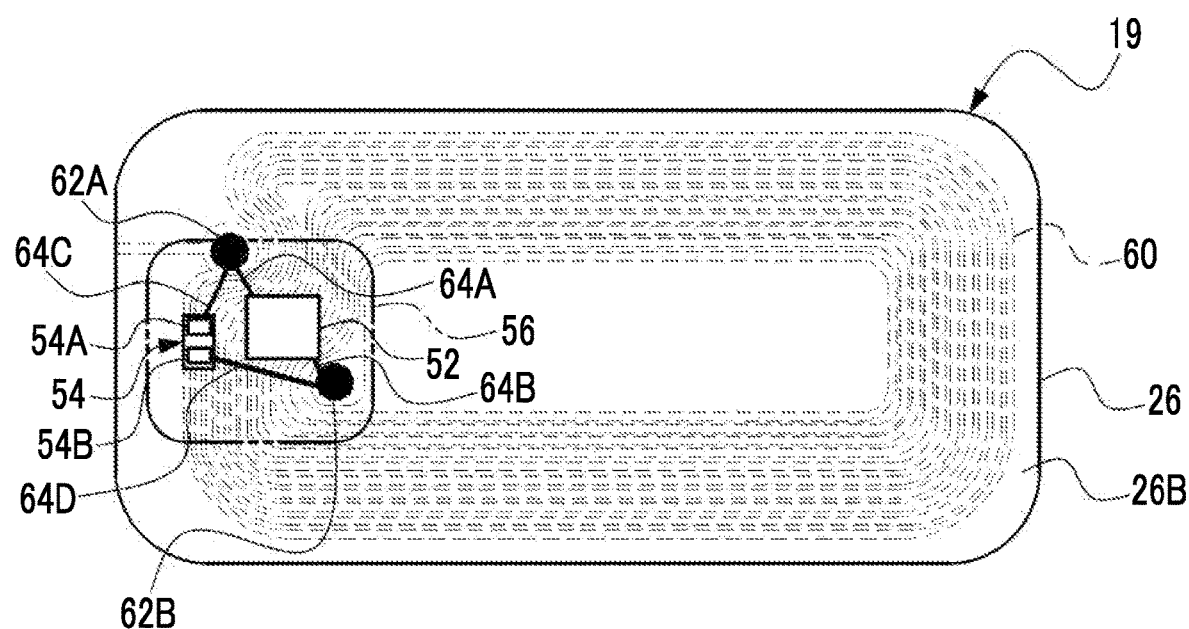
FIG. 9 is a schematic plan view showing an example of the structure of a front surface of the substrate of the cartridge memory in the magnetic tape cartridge.

As shown in FIG. 9 as an example, on the front surface 26B of the cartridge memory 19, the IC chip 52 and the capacitor 54 are electrically connected to each other by a wire connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 9, a pair of electrodes is electrodes 54A and 54B. The electrode 54A is connected to the first conduction portion 62A through a wiring 64C, and the electrode 54B is connected to the second conduction portion 62B through a wiring 64D. With this, the IC chip 52 and the capacitor 54 are connected in parallel with the antenna coil 60.

Figure 10:
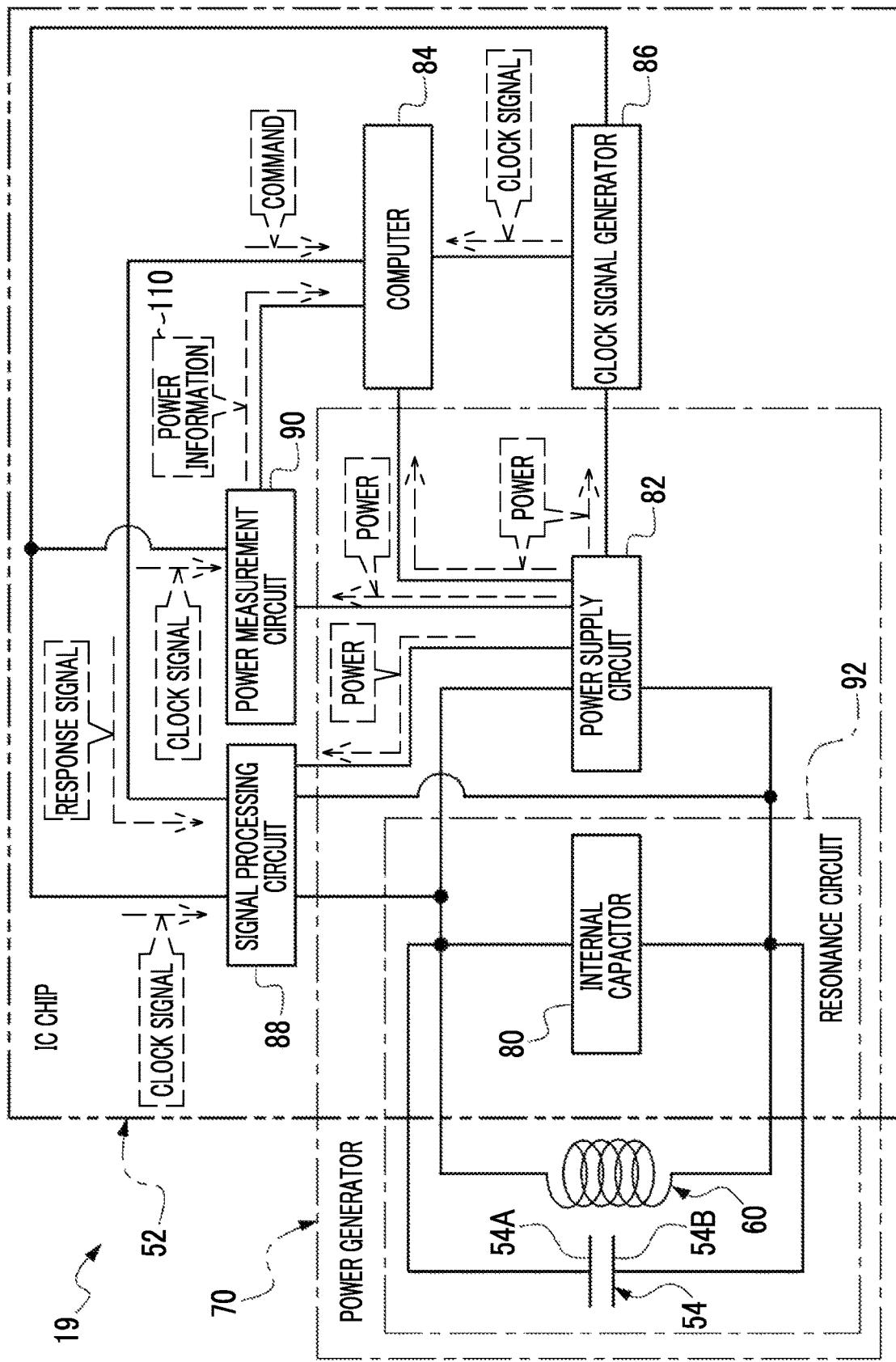
FIG. 10 is a schematic circuit diagram showing an example of the circuit configuration of the cartridge memory in the magnetic tape cartridge.

As shown in FIG. 10 as an example, the IC chip 52 comprises an internal capacitor 80, a power supply circuit 82, a computer 84, a clock signal generator 86, a signal processing circuit 88, and a power measurement circuit 90. The IC chip 52 is a general-purpose IC chip that is also usable for purposes other than the magnetic tape cartridge 10.

The cartridge memory 19 comprises a power generator 70. The power generator 70 generates power with application of the magnetic field MF from the noncontact reading and writing device 50A to the antenna coil 60. Specifically, the power generator 70 generates alternating-current power using a resonance circuit 92, converts the generated alternating-current power into direct-current power, and outputs the direct-current power.

The power generator 70 has the power supply circuit 82 and the resonance circuit 92. The resonance circuit 92 comprises the capacitor 54, the antenna coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the antenna coil 60.

The capacitor 54 is a capacitor externally attached to the IC chip 52. The IC chip 52 is a general-purpose IC chip that is intrinsically usable for purposes different from the magnetic tape cartridge 10. For this reason, the capacitance of the internal capacitor 80 may not be enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is a frequency (for example, 13.56 MHz) corresponding to a frequency of the magnetic field MF, and may be suitably determined depending on the specification or the like of the cartridge memory 19 and/or the noncontact reading and writing device 50A. The capacitance of the capacitor 54 is determined based on a measured value of the capacitance of the internal capacitor 80. Here, although a form example where the capacitor 54 is externally attached has been described, the technique of the present disclosure is not limited thereto, and the capacitor 54 may be incorporated in advance into the IC chip 52.

The resonance circuit 92 generates an alternating-current power by generating a resonance phenomenon at the resonance frequency determined in advance using the induced current induced by the antenna coil 60 with the magnetic field MF passing through the antenna coil 60 and outputs the generated alternating-current power to the power supply circuit 82.

The power supply circuit 82 has a rectifier circuit, a smoothing circuit, and the like. The rectifier circuit is a full-wave rectifier circuit having a plurality of diodes. The full-wave rectifier circuit is merely an example, and a half-wave rectifier circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. The power generated by the power supply circuit 82 becomes greater within a limit range as the intensity of the magnetic field MF is greater.

Examples of various drive elements as a supply destination of power include the computer 84, the clock signal generator 86, and the signal processing circuit 88. The power is supplied to various drive elements in the IC chip 52 by the power generator 70, whereby the IC chip 52 operates with the power generated by the power generator 70.

The computer 84 controls the operation of the entire cartridge memory 19. The clock signal generator 86 generates a clock signal and outputs the clock signal to the signal processing circuit 88 and the like. The signal processing circuit 88 and the like operate in response to the clock signal input from the clock signal generator 86. The clock signal generator 86 changes a frequency of the clock signal in response to an instruction of the computer 84.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command from the magnetic field MF received by the antenna coil 60 and outputs the command to the computer 84. The computer 84 outputs a response signal to the command to the signal processing circuit 88. That is, the computer 84 executes processing depending on the command input from the signal processing circuit 88 and outputs a processing result as a response signal to the signal processing circuit 88. In a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50A through the magnetic field MF.

The power measurement circuit 90 is an example of a "measurement circuit" according to the technique of the present disclosure, and measures the power generated by the power supply circuit 82 and outputs power information 110 that is information regarding the measured power, to the computer 84. With this, the computer 84 can execute processing depending on the power information 110 input from the power measurement circuit 90.

Figure 11:
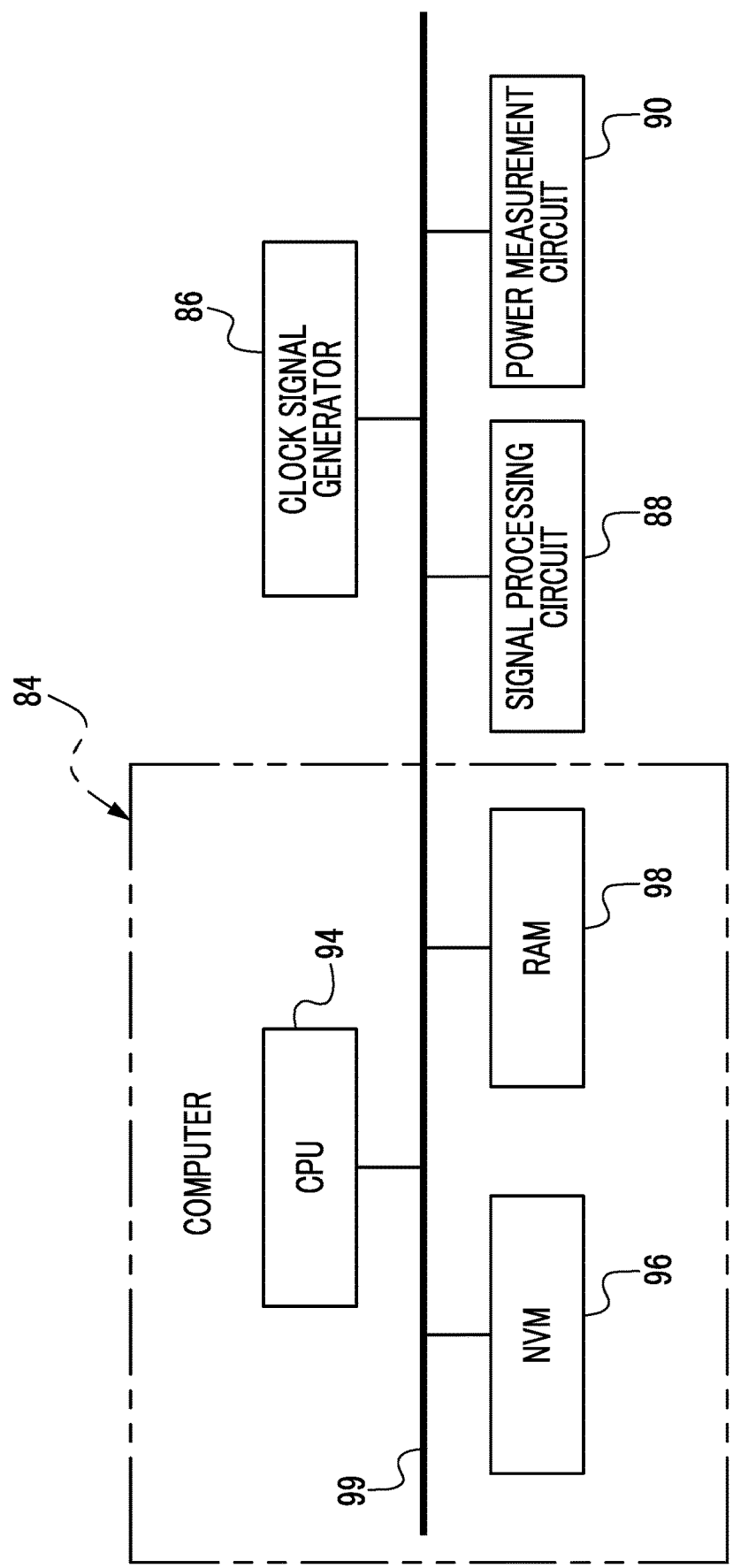
FIG. 11 is a block diagram showing an example of the hardware configuration of an electric system of a computer of an IC chip mounted on the cartridge memory in the magnetic tape cartridge.

As shown in FIG. 11 as an example, the computer 84 comprises a CPU 94, an NVM 96, and a RAM 98. The CPU 94, the NVM 96, and the RAM 98 are connected to a bus 99.

The CPU 94 controls the operation of the computer 84. An example of the NVM 96 is an EEPROM. The EEPROM is merely an example, and for example, a ferroelectric memory may be used instead of the EEPROM or any memory may be used as long as the memory is a non-volatile memory that can be mounted on the IC chip 52. Management information 100 (see FIG. 12) and the like are stored in the NVM 96. The RAM 98 temporarily stores various kinds of information and is used as a work memory. An example of the RAM 98 is a DRAM or an SRAM.

The clock signal generator 86, the signal processing circuit 88, and the power measurement circuit 90 are also connected to the bus 99. Accordingly, the CPU 94 can acquire the clock signal from the clock signal generator 86, can perform transfer of signals with the signal processing circuit 88, or can acquire the power information 110 from the power measurement circuit 90.

The CPU 94 executes processing depending on the command input from the signal processing circuit 88. Examples of the type of the command include a polling command, a readout command, and a write-in command. The CPU 94 executes polling processing depending on the polling command input from the signal processing circuit 88.

The polling processing is processing of establishing communication with the noncontact reading and writing device 50A, and is executed, for example, as preparation processing in a pre-stage of readout processing and write-in processing. The CPU 94 executes readout processing depending on the readout command input from the signal processing circuit 88. The readout processing is processing of reading out the management information 100 (see FIG. 12) and the like from the NVM 96. The CPU 94 executes write-in processing depending on the write-in command input from the signal processing circuit 88. The write-in processing is processing of writing the management information 100 (see FIG. 12) into the NVM 96.

Examples of the type of the command other than the polling command, the readout command, and the write-in command include a power information transmission request command and an identifier transmission request command. The CPU 94 executes power information transmission processing depending on the power information transmission request command input from the signal processing circuit 88. The power information transmission processing is processing of acquiring the power information 110 from the power measurement circuit 90 and transmitting the acquired power information 110 as a response signal to the noncontact reading and writing device 50A through the signal processing circuit 88 and the like. The CPU 94 executes identifier transmission processing depending on the identifier transmission request command input from the signal processing circuit 88. The identifier transmission processing is processing of acquiring an identifier 106 (see FIG. 12) described below from the NVM 96 and transmitting the acquired identifier 106 as a response signal to the noncontact reading and writing device 50A through the signal processing circuit 88 and the like.

Figure 12:
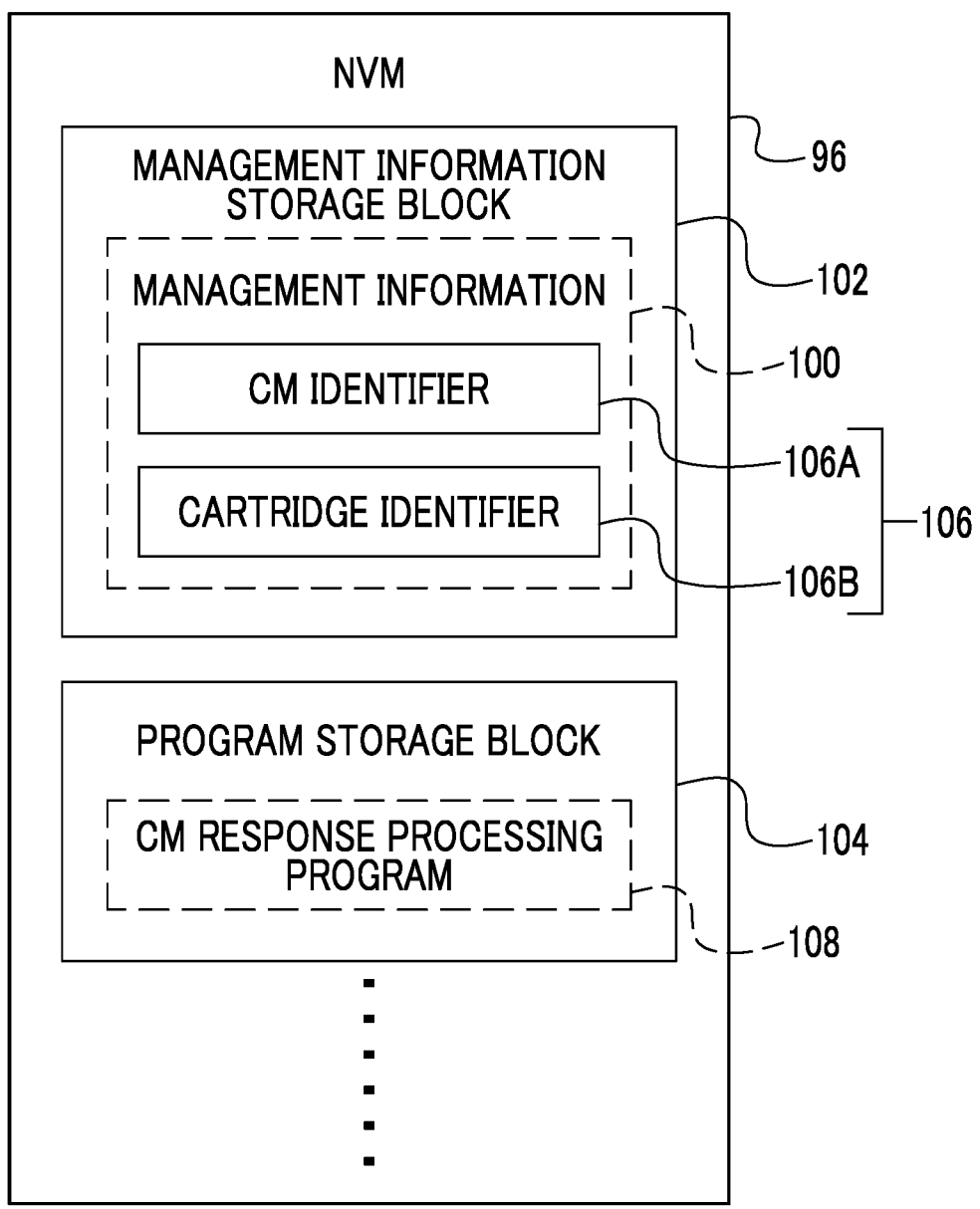
FIG. 12 is a conceptual diagram showing an example of storage contents of an NVM in the computer of the IC chip mounted on the cartridge memory.

As shown in FIG. 12 as an example, the NVM 96 has a plurality of storage blocks including a management information storage block 102 and a program storage block 104. The management information 100 is stored in the management information storage block 102. The management information 100 is information including a CM identifier 106A and a cartridge identifier 106B. The CM identifier 106A indicates an identifier (for example, a manufacture serial number of the cartridge memory 19) capable of specifying the cartridge memory 19. The cartridge identifier 106B indicates an identifier (for example, a manufacture serial number of the magnetic tape cartridge 10) capable of specifying the magnetic tape cartridge 10. Hereinafter, the CM identifier 106A and the cartridge identifier 106B are written as the identifier 106 in a case where there is no need for distinction therebetween.

Figure 13:
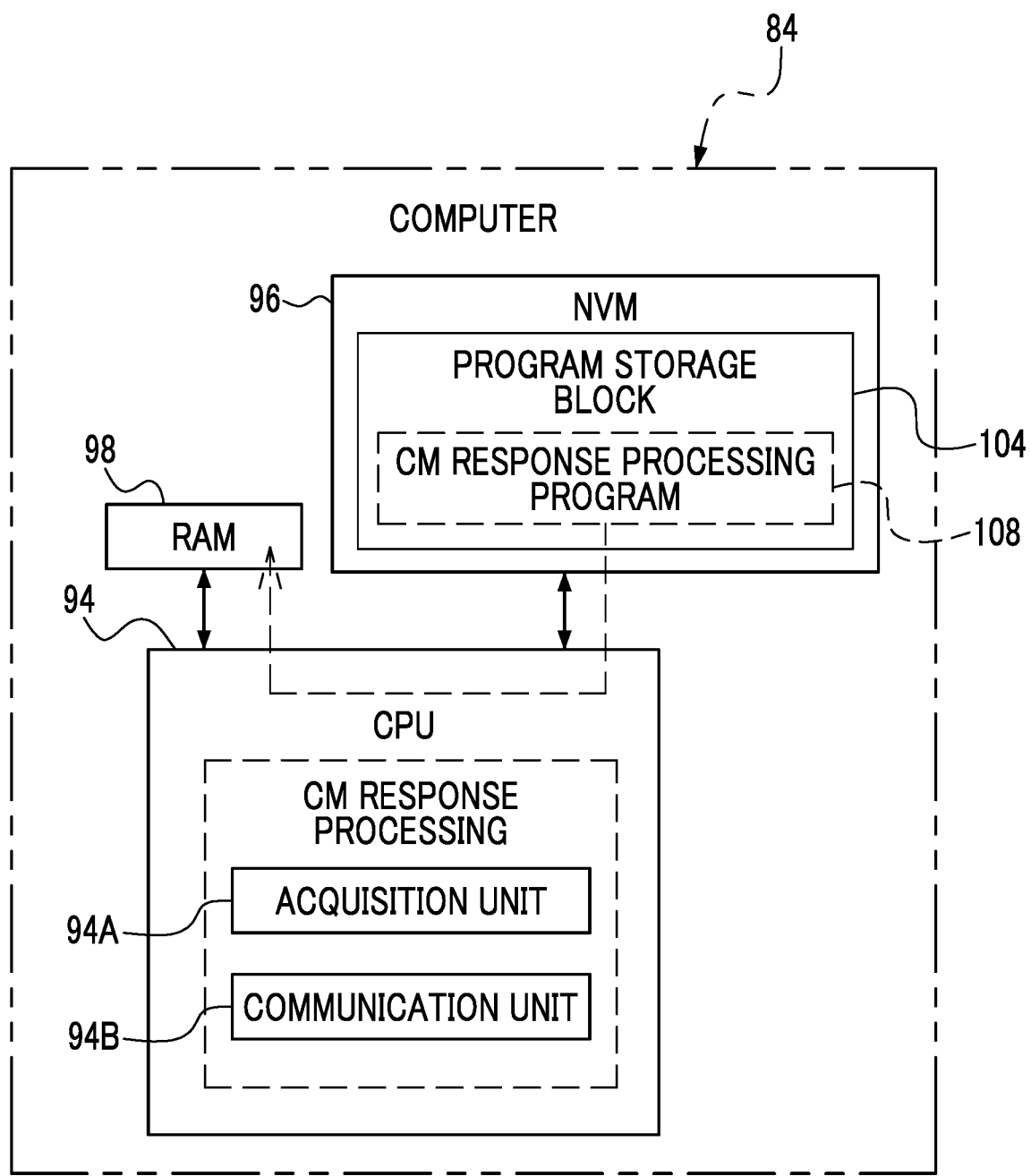
FIG. 13 is a block diagram showing an example of an aspect where a CM response processing program is executed by a CPU in the computer of the IC chip mounted on the cartridge memory.

ACM response processing program 108 is stored in the program storage block 104. As shown in FIG. 13 as an example, the CPU 94 reads out the CM response processing program 108 from the program storage block 104 and executes the read-out CM response processing program 108 on the RAM 98. The CPU 94 executes CM response processing (see FIG. 28) following the CM response processing program 108 that is executed on the RAM 98. The CM response processing is realized by the CPU 94 operating as an acquisition unit 94A and a communication unit 94B following the CM response processing program 108.

Figure 14:
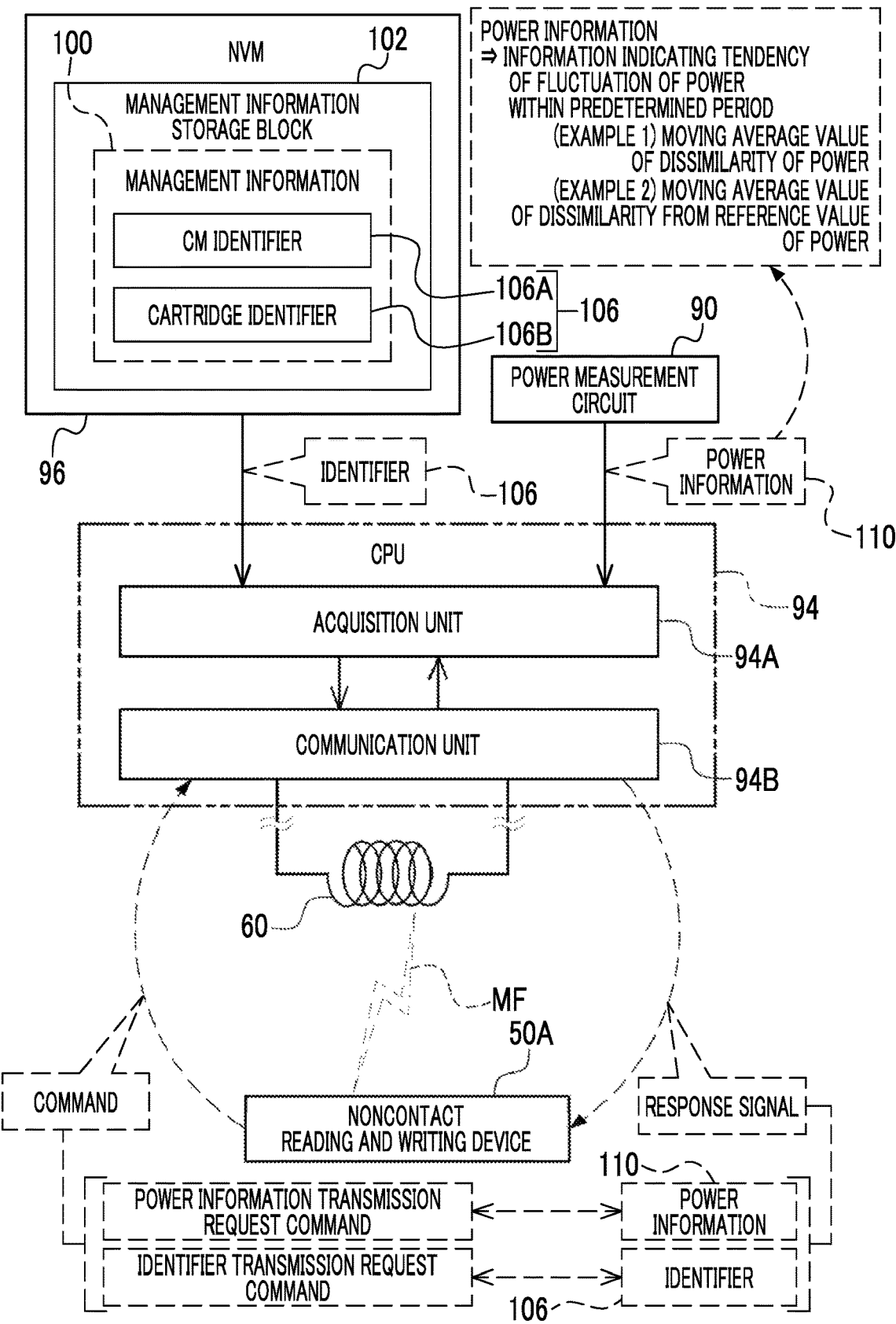
FIG. 14 is a conceptual diagram showing an example of processing contents in the computer of the IC chip mounted on the cartridge memory.

As described above, in a case where the polling processing is executed such that communication is established between the noncontact reading and writing device 50A and the communication unit 94B, as shown in FIG. 14 as an example, the communication unit 94B transmits a response signal depending on a command given from the noncontact reading and writing device 50A, to the noncontact reading and writing device 50A. In a case where the noncontact reading and writing device 50A transmits the power information transmission request command, the communication unit 94B receives the power information transmission request command through the antenna coil 60. Then, in a case where the power information transmission request command is received by the communication unit 94B, the acquisition unit 94A acquires the power information 110 from the power measurement circuit 90.

In the present embodiment, as an example of the power information 110, information indicating a tendency of fluctuation of power generated within a predetermined period by the power supply circuit 82 is used. Here, the predetermined period indicates, for example, a period divided by a given time of several milliseconds to hundreds of milliseconds. The predetermined period may be a fixed value or may be a variable value that is changed depending on an operation status of the IC chip 52 and/or a command or the like given from the outside (for example, the noncontact reading and writing device 50A). The tendency of fluctuation of power indicates, for example, change with time of power. The change with time of power may be change with time of an absolute value of power measured in real time or may be change with time of a moving average value of power. The tendency of fluctuation of power may be a tendency of increase/decrease of power. The increase/decrease of power may be an increase/decrease of an absolute value of power measured in real time or may be an increase/decrease of a moving average value of power.

In the present embodiment, the power information 110 is information defined by a relative value of power. Here, the relative value of power indicates a ratio of current power (for example, an absolute value of current power) to maximum power generated by the power supply circuit 82. The technique of the present disclosure does not need to be limited thereto, and the power information 110 may be information defined by dissimilarity from a reference value of power or may be information defined by a simple absolute value of power. Here, the reference value indicates, for example, power (for example, a moving average value of an absolute value of power measured within a given period) determined in advance as reference power. Accordingly, the dissimilarity from the reference value of power may be a difference between current power (for example, an absolute value of current power) and the reference value or may be a ratio of one value of current power and the reference value to the other value.

The communication unit 94B transmits the power information 110 acquired by the acquisition unit 94A, as a response signal to the power information transmission request command to the noncontact reading and writing device 50A. The noncontact reading and writing device 50A receives the power information 110 transmitted as the response signal from the communication unit 94B. Specifically, the power information 110 transmitted as the response signal from the communication unit 94B is received by a transmission and reception device 112 (see FIG. 15) described below.

In a case where the noncontact reading and writing device 50A transmits the identifier transmission request command, the communication unit 94B receives the identifier transmission request command through the antenna coil 60. Then, in a case where the identifier transmission request command is received by the communication unit 94B, the acquisition unit 94A acquires the identifier 106 from the management information storage block 102.

The communication unit 94B transmits the identifier 106 acquired by the acquisition unit 94A, as a response signal to the identifier transmission request command to the noncontact reading and writing device 50A. The noncontact reading and writing device 50A receives the identifier 106 transmitted as the response signal from the communication unit 94B. Here, although a form example where the CM identifier 106A and the cartridge identifier 106B are transmitted as the response signal to the noncontact reading and writing device 50A has been described, this is merely an example, and one of the CM identifier 106A and the cartridge identifier 106B may be transmitted as the response signal to the noncontact reading and writing device 50A.

Figure 15:
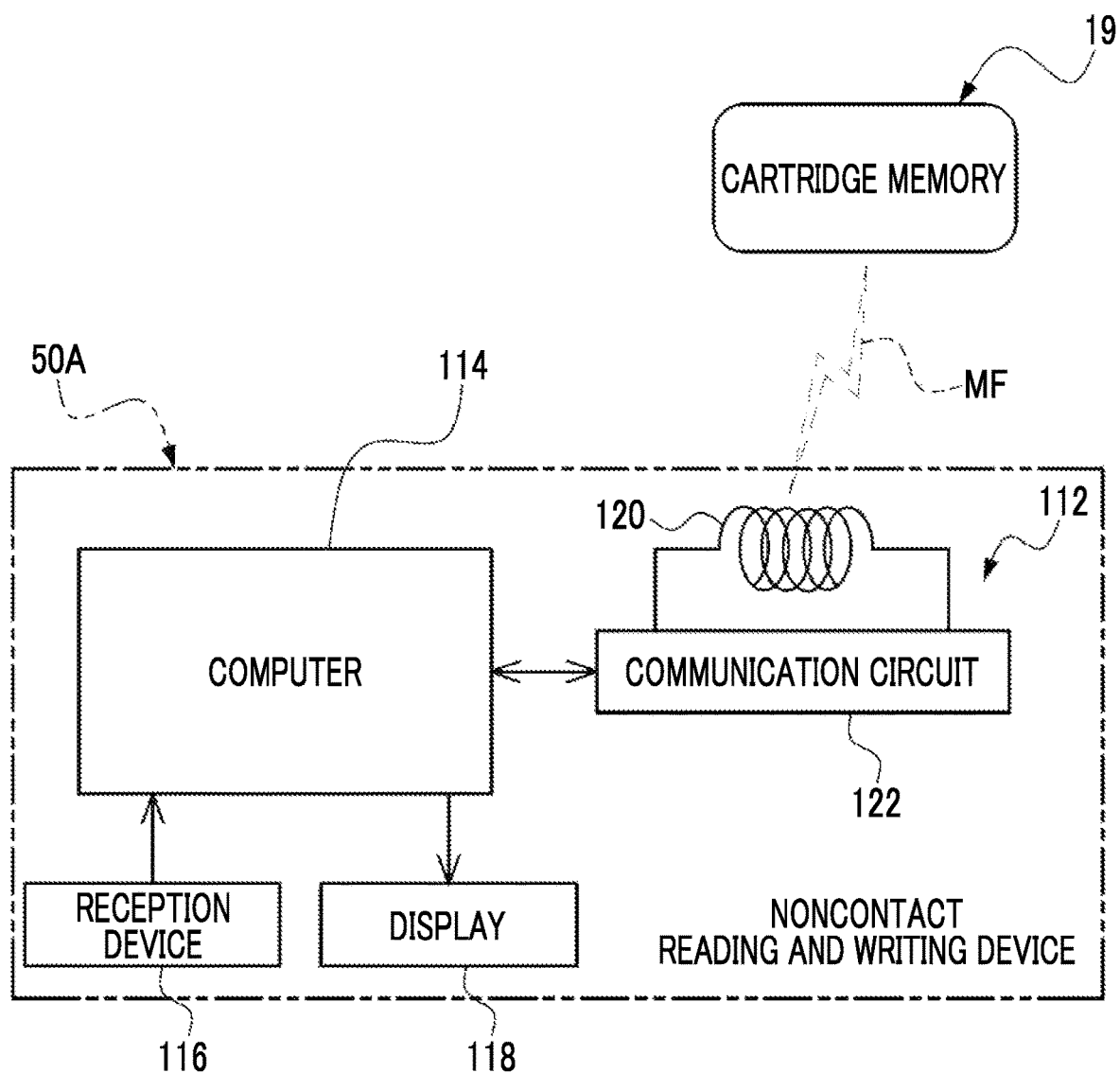
FIG. 15 is a block diagram showing an example of the hardware configuration of an electric system in the noncontact reading and writing device.

As shown in FIG. 15 as an example, the noncontact reading and writing device 50A comprises a transmission and reception device 112, a computer 114, a reception device 116, and a display 118. The transmission and reception device 112 applies the magnetic field MF (see FIGS. 6 and 7) to the cartridge memory 19 to induce power in the cartridge memory 19 and is coupled to the cartridge memory 19 by electromagnetic induction to perform transmission and reception of information with the cartridge memory 19. Here, transmission and reception of information indicate, for example, transmission of the above-described command to the cartridge memory 19 and reception of the response signal from the cartridge memory 19.

The transmission and reception device 112 comprises an antenna coil 120 and a communication circuit 122. The communication circuit 122 is connected to the computer 114 and operates in response to an instruction from the computer 114. The antenna coil 120 is connected to the communication circuit 122, and the communication circuit 122 emits the magnetic field MF from the antenna coil 120 in response to an instruction from the computer 114. Though details will be described below, the intensity of the magnetic field MF is adjusted by the communication circuit 122 in response to an instruction from the computer 114.

The communication circuit 122 superimposes a command on the magnetic field MF (see FIGS. 6 and 7) in response to an instruction from the computer 114 to transmit the command to the cartridge memory 19. The communication circuit 122 receives the response signal superimposed on the magnetic field MF by the cartridge memory 19, through the antenna coil 120, decodes the received response signal, and outputs the response signal to the computer 114. The computer 114 operates in response to the response signal input from the communication circuit 122.

The reception device 116 and the display 118 are connected to the computer 114. The reception device 116 is a keyboard and/or a touch panel, and receives an instruction from a user or the like (hereinafter, simply referred to as a "user or the like") of the noncontact reading and writing device 50A. The computer 114 operates in response to the instruction received by the reception device 116. The display 118 is an example of a "presentation device" according to the technique of the present disclosure, and displays various kinds of information under the control of the computer 114. An example of the display 118 is an EL display or a liquid crystal display. Here, although the display 118 has been illustrated as an example of specific means for presenting information, the technique of the present disclosure is not limited thereto, and a speaker, a vibrator, and/or a printer may be used instead of the display 118 or along with the display 118. Any presentation device may be used as long as necessary information can be presented to the user or the like.

Figure 16:
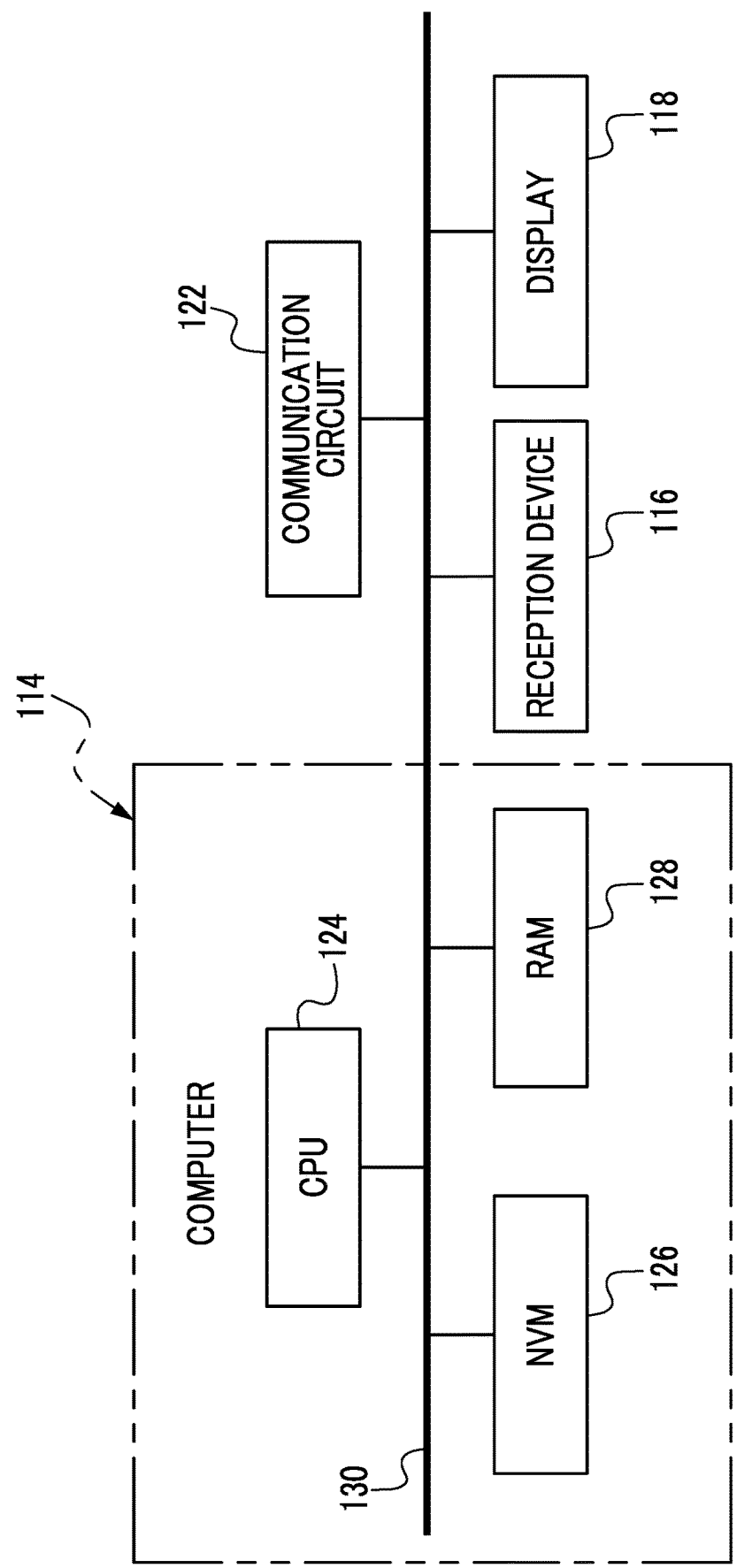
FIG. 16 is a block diagram showing an example of the hardware configuration of a computer in the noncontact reading and writing device.

As shown in FIG. 16 as an example, the computer 114 comprises a CPU 124, an NVM 126, and a RAM 128. The CPU 124, the NVM 126, and the RAM 128 are connected to a bus 130.

The CPU 124 is an example of a "processor" according to the technique of the present disclosure, and controls the operation of the computer 114. An example of the NVM 126 is an EEPROM. The EEPROM is merely an example, and for example, a ferroelectric memory may be used instead of the EEPROM or any memory may be used as long as the memory is a non-volatile memory that can be mounted in the noncontact reading and writing device 50A. The RAM 128 temporarily stores various kinds of information and is used as a work memory. An example of the RAM 128 is a DRAM or an SRAM.

The reception device 116 and the display 118 are also connected to the bus 130. Accordingly, the CPU 124 can ascertain an instruction received by the reception device 116 or can control the display 118. The communication circuit 122 is also connected to the bus 130. Accordingly, the CPU 124 controls the communication circuit 122 to be able to generate the magnetic field MF, adjust the intensity of the magnetic field MF, superimpose a modulated command on the magnetic field MF to transmit the command to the cartridge memory 19, and acquire a response signal decoded by the communication circuit 122.

Figure 17:
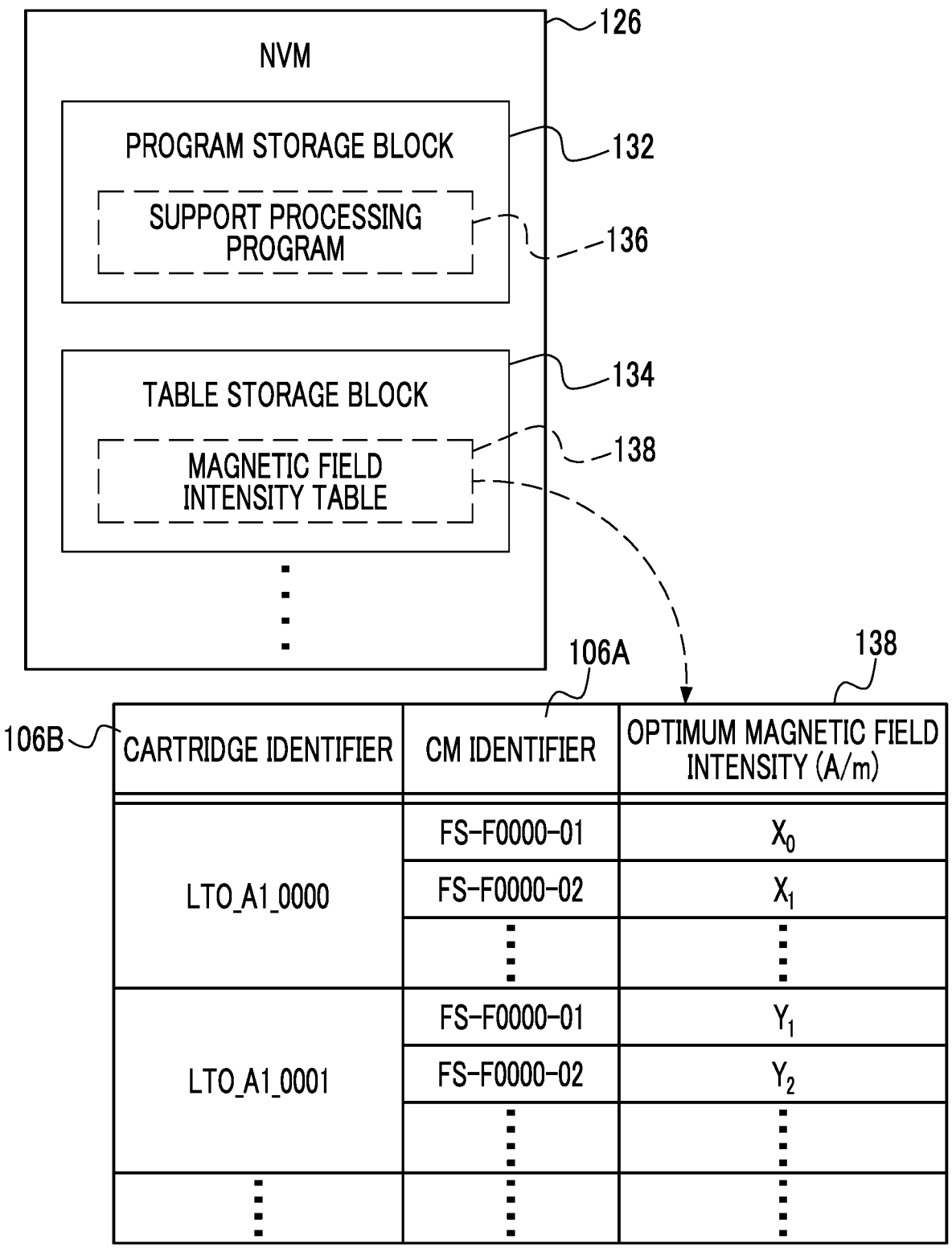
FIG. 17 is a conceptual diagram showing an example of storage contents of an NVM included in the computer in the noncontact reading and writing device.

As shown in FIG. 17 as an example, the NVM 126 has a plurality of storage blocks including a program storage block 132 and a table storage block 134. A support processing program 136 is stored in the program storage block 132. The support processing program 136 is an example of a "program" according to the technique of the present disclosure.

By the way, a distance between the noncontact reading and writing device 50A and the cartridge memory 19 and/or a positional relationship between the noncontact reading and writing device 50A and the cartridge memory 19 are predicted to vary depending on the specification and/or a manufacturing error of the magnetic tape cartridge 10. Such a variation is predicted to have an influence on power that is generated in the cartridge memory 19 with the application of the magnetic field MF. To stabilize power in the cartridge memory 19, an optimum intensity of the magnetic field MF is preferably determined in advance for each combination of the magnetic tape cartridge 10 and the cartridge memory 19.

Accordingly, in the noncontact reading and writing device 50A according to the present embodiment, a magnetic field intensity table 138 is stored in a table storage block 134. The magnetic field intensity table 138 is a table in which the identifier 106 and an optimum magnetic field intensity are associated with each other. Specifically, in the magnetic field intensity table 138, for each cartridge identifier 106B, the optimum magnetic field intensity is associated with each of a plurality of CM identifiers 106A. The CM identifier 106A associated with the cartridge identifier 106B is an identifier that specifies the cartridge memory 19 mounted in the magnetic tape cartridge 10 specified by the cartridge identifier 106B. The optimum magnetic field intensity associated with each CM identifier 106A on the cartridge identifier 106B is an intensity that is determined in advance as an optimum intensity of the magnetic field MF to be applied to the cartridge memory 19 mounted in the magnetic tape cartridge 10 specified by the cartridge identifier 106B. The intensity determined in advance as the optimum intensity of the magnetic field MF is, for example, an intensity calculated in advance as the intensity of the magnetic field MF required for stably operating the cartridge memory 19, by a test with a real machine and/or a computer simulation.

Figure 18:
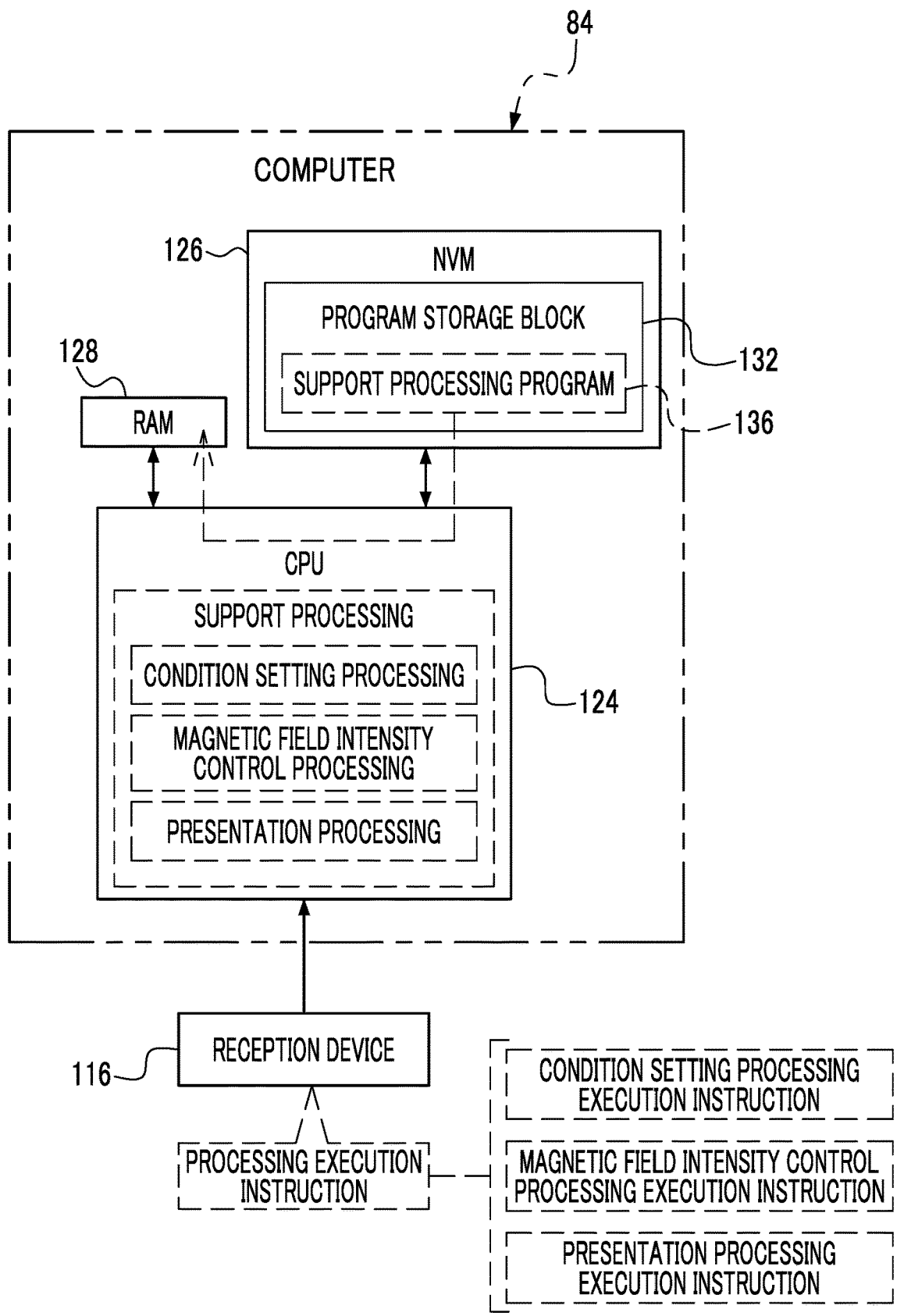
FIG. 18 is a block diagram showing an example of an aspect where a support processing program is executed by a CPU in the computer in the noncontact reading and writing device.

As shown in FIG. 18 as an example, the CPU 124 reads out the support processing program 136 from the program storage block 132 and executes the read-out support processing program 136 on the RAM 128. The CPU 124 executes support processing (see FIG. 24) following the support processing program 136 that is executed on the RAM 128. The support processing is processing of supporting transmission and reception of information between the cartridge memory 19 and the noncontact reading and writing device 50A based on the power information 110 (see FIG. 14) received by the transmission and reception device 112 (see FIG. 15). Processing including the support processing that is executed by the CPU 124 is an example of "specific processing" according to the technique of the present disclosure.

The support processing is processing including condition setting processing, magnetic field intensity control processing, and presentation processing. The CPU 124 selectively executes the condition setting processing, the magnetic field intensity control processing, and the presentation processing in response to a processing execution instruction received by the reception device 116. The processing execution instruction is any of a condition setting processing execution instruction, a magnetic field intensity control processing execution instruction, and a presentation processing execution instruction. In a case where the condition setting processing execution instruction is received by the reception device 116, the condition setting processing is executed by the CPU 124. In a case where the magnetic field intensity control processing execution instruction is received by the reception device 116, the magnetic field intensity control processing is executed by the CPU 124. In a case where the presentation processing execution instruction is received by the reception device 116, the presentation processing is executed by the CPU 124.

The condition setting processing is processing of satisfying a predetermined state reaching condition based on the power information 110 (see FIG. 14) received by the transmission and reception device 112 (see FIG. 15). Here, the predetermined state reaching condition indicates a condition for bringing a state of power in the cartridge memory 19, that is, power measured by the power measurement circuit 90 to a predetermined state. The condition for bringing the state of power to the predetermined state indicates a condition that the intensity of the magnetic field MF is an intensity for bringing the state of power to the predetermined state. The predetermined state indicates a state in which the operation of the cartridge memory 19 is stable. Here, the "state in which the operation of the cartridge memory 19 is stable" indicates, for example, a state in which the cartridge memory 19 does not fall into a power shortage, and the IC chip 52 can execute processing depending on the command given from the noncontact reading and writing device 50A without delay.

The magnetic field intensity control processing is processing of controlling the intensity of the magnetic field MF based on the power information 110 (see FIG. 14) received by the transmission and reception device 112 (see FIG. 15). The presentation processing is processing of displaying reference information 144 (see FIG. 23) based on the power information 110 (see FIG. 14) received by the transmission and reception device 112 (see FIG. 15) on the display 118 (see FIGS. 16 and 23).

Figure 19:
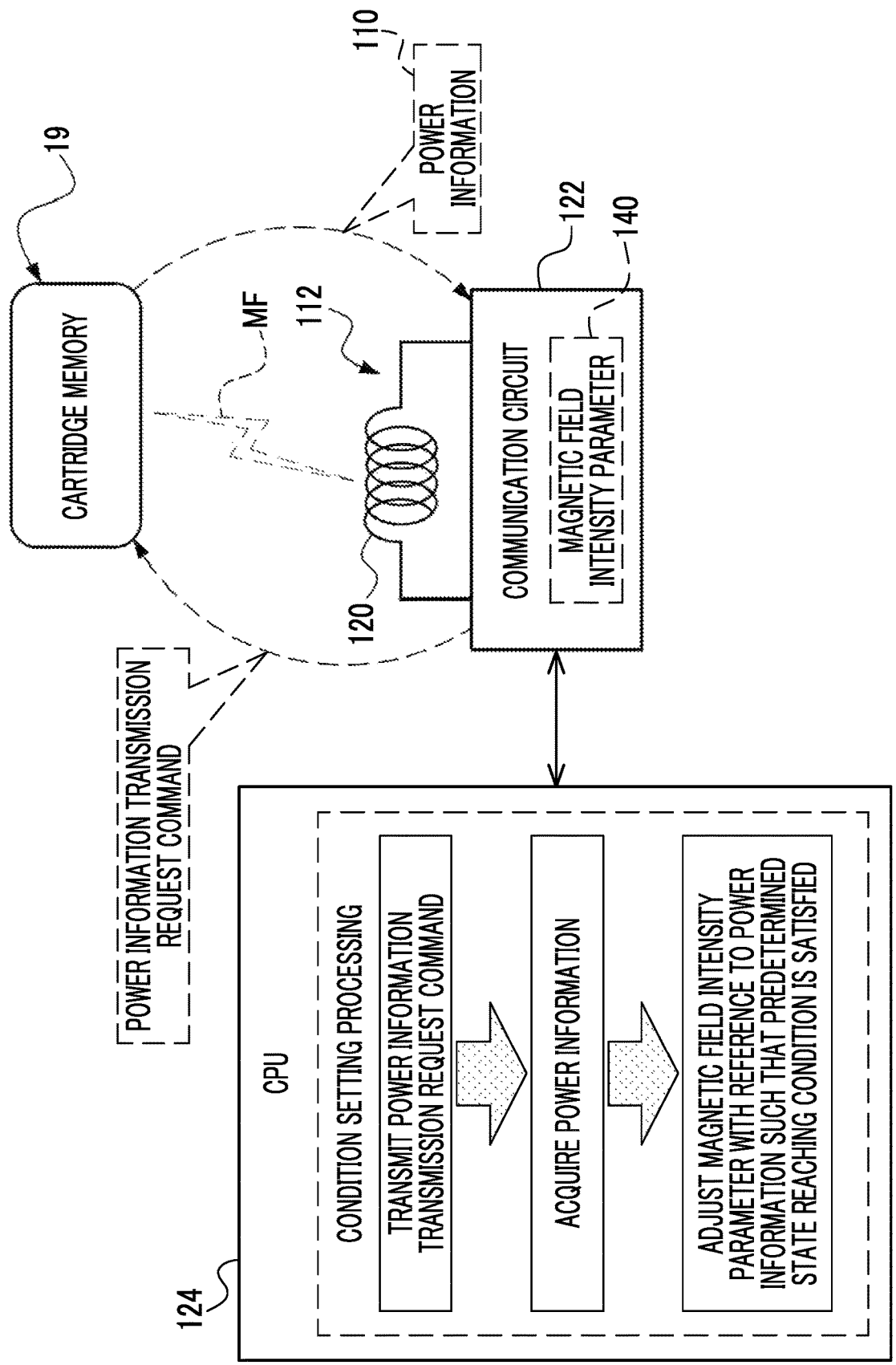
FIG. 19 is a conceptual diagram showing an example of contents of condition setting processing included in support processing.

As shown in FIG. 19 as an example, the communication circuit 122 holds a magnetic field intensity parameter 140. The magnetic field intensity parameter 140 is an example of a "parameter" according to the technique of the present disclosure. The magnetic field intensity parameter 140 is a parameter that adjusts the intensity of the magnetic field MF, and is controlled by the CPU 124. The communication circuit 122 adjusts the intensity of the magnetic field MF emitted from the antenna coil 120 following the magnetic field intensity parameter 140 controlled by the CPU 124. In this case, for example, in a case where the value of the magnetic field intensity parameter 140 increases/decreases, the intensity of the magnetic field MF also increases/decreases accordingly.

In the condition setting processing, the CPU 124 causes the communication circuit 122 to transmit the power information transmission request command to the cartridge memory 19. Accordingly, the power information 110 is transmitted from the cartridge memory 19 to the transmission and reception device 112. The transmission and reception device 112 receives the power information 110 transmitted from the cartridge memory 19, and the CPU 124 acquires the power information 110 received by the transmission and reception device 112.

In the condition setting processing, the CPU 124 adjusts the magnetic field intensity parameter 140 to satisfy the predetermined state reaching condition with reference to the power information 110 acquired from the transmission and reception device 112. The CPU 124 compares the power information 110 acquired from the transmission and reception device 112 with power (hereinafter, referred to as "comparison target power") determined in advance as power for stabilizing the operation of the cartridge memory 19, and adjusts the magnetic field intensity parameter 140 such that the intensity of the magnetic field MF becomes an intensity for bringing the state of power to the predetermined state, with reference to a comparison result. That is, in a case where the power information 110 acquired from the transmission and reception device 112 is smaller than the comparison target power, the CPU 124 adjusts the magnetic field intensity parameter 140 such that the intensity of the magnetic field MF for causing the power in the cartridge memory 19, that is, the power measured by the power measurement circuit 90 to reach power corresponding to at least the comparison target power is realized.

Figure 20:
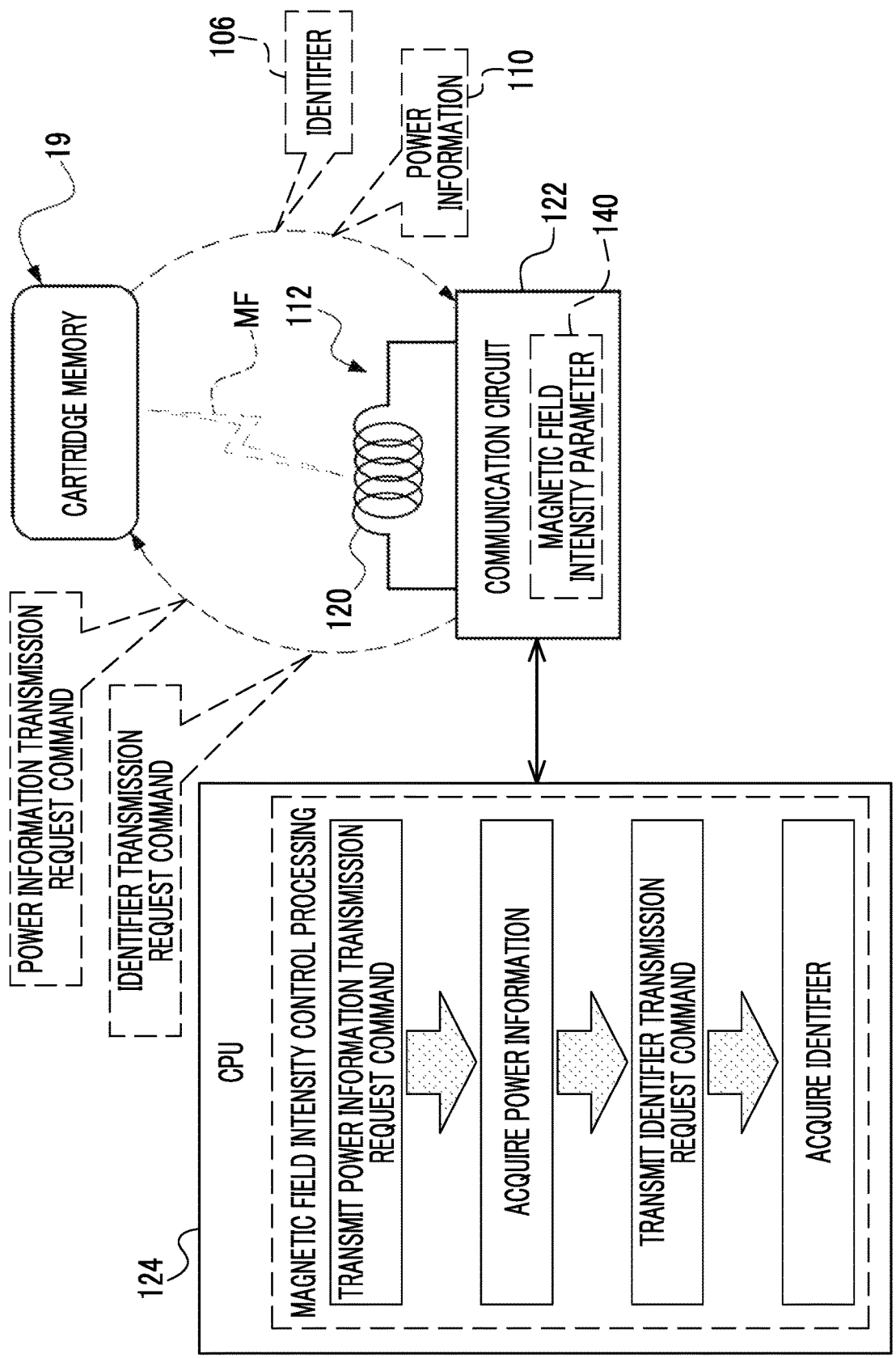
FIG. 20 is a conceptual diagram showing an example of contents of magnetic field intensity control processing included in the support processing.

As shown in FIG. 20 as an example, in the magnetic field intensity control processing, the CPU 124 causes the communication circuit 122 to transmit the power information transmission request command to the cartridge memory 19. Accordingly, the power information 110 is transmitted from the cartridge memory 19 to the transmission and reception device 112. The transmission and reception device 112 receives the power information 110 transmitted from the cartridge memory 19, and the CPU 124 acquires the power information 110 received by the transmission and reception device 112.

In the magnetic field intensity control processing, the CPU 124 causes the communication circuit 122 to transmit the identifier transmission request command to the cartridge memory 19. Accordingly, the identifier 106 is transmitted from the cartridge memory 19 to the transmission and reception device 112. The transmission and reception device 112 receives the identifier 106 transmitted from the cartridge memory 19, and the CPU 124 acquires the identifier 106 received by the transmission and reception device 112.

Figure 21:
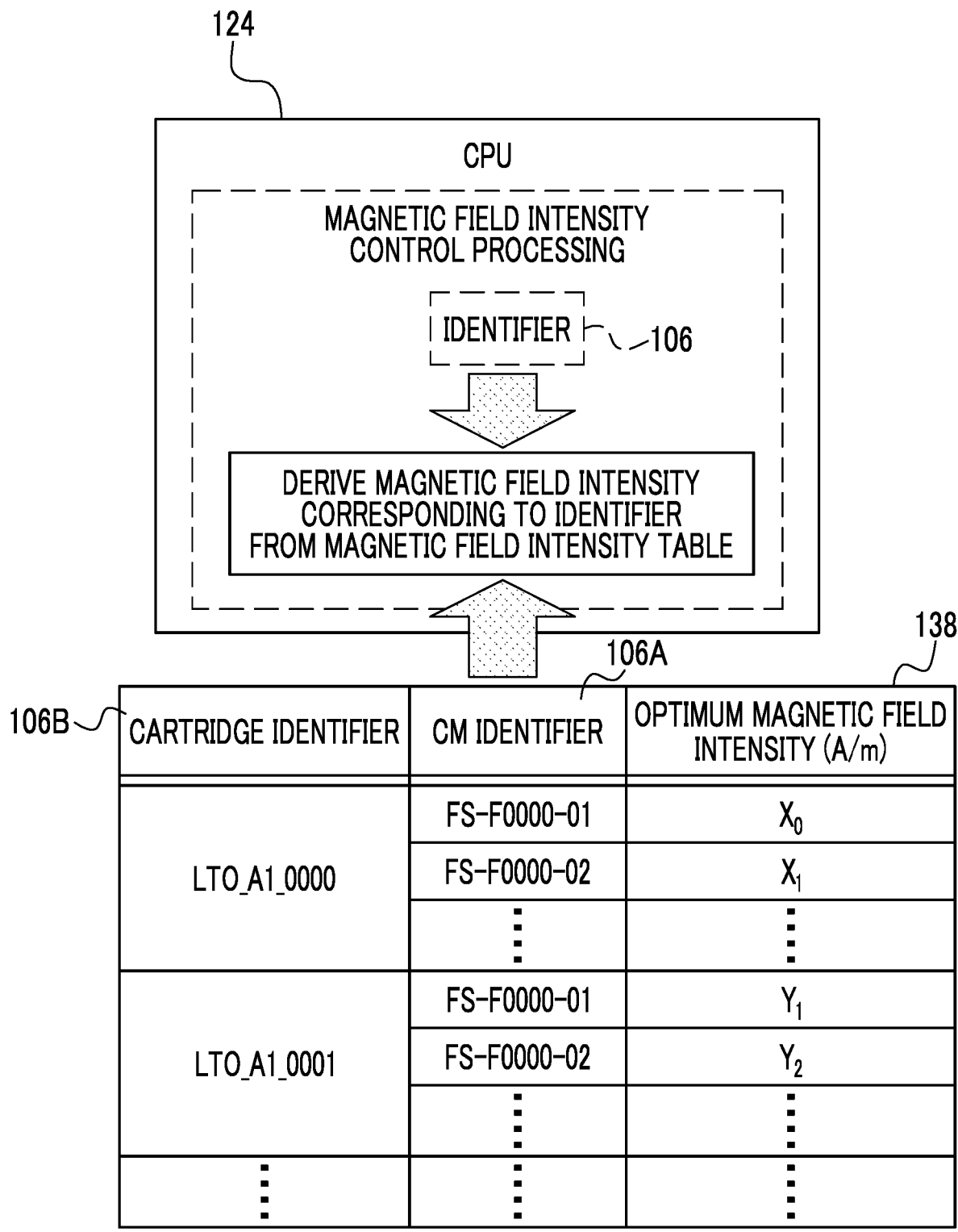
FIG. 21 is a conceptual diagram showing an example of contents of the magnetic field intensity control processing included in the support processing.

As shown in FIG. 21 as an example, in the magnetic field intensity control processing, the CPU 124 derives the optimum magnetic field intensity corresponding to the identifier 106 acquired from the transmission and reception device 112, from the magnetic field intensity table 138. That is, the CPU 124 derives the optimum magnetic field intensity corresponding to the cartridge identifier 106B and the CM identifier 106A acquired from the transmission and reception device 112, from the magnetic field intensity table 138.

Figure 22:
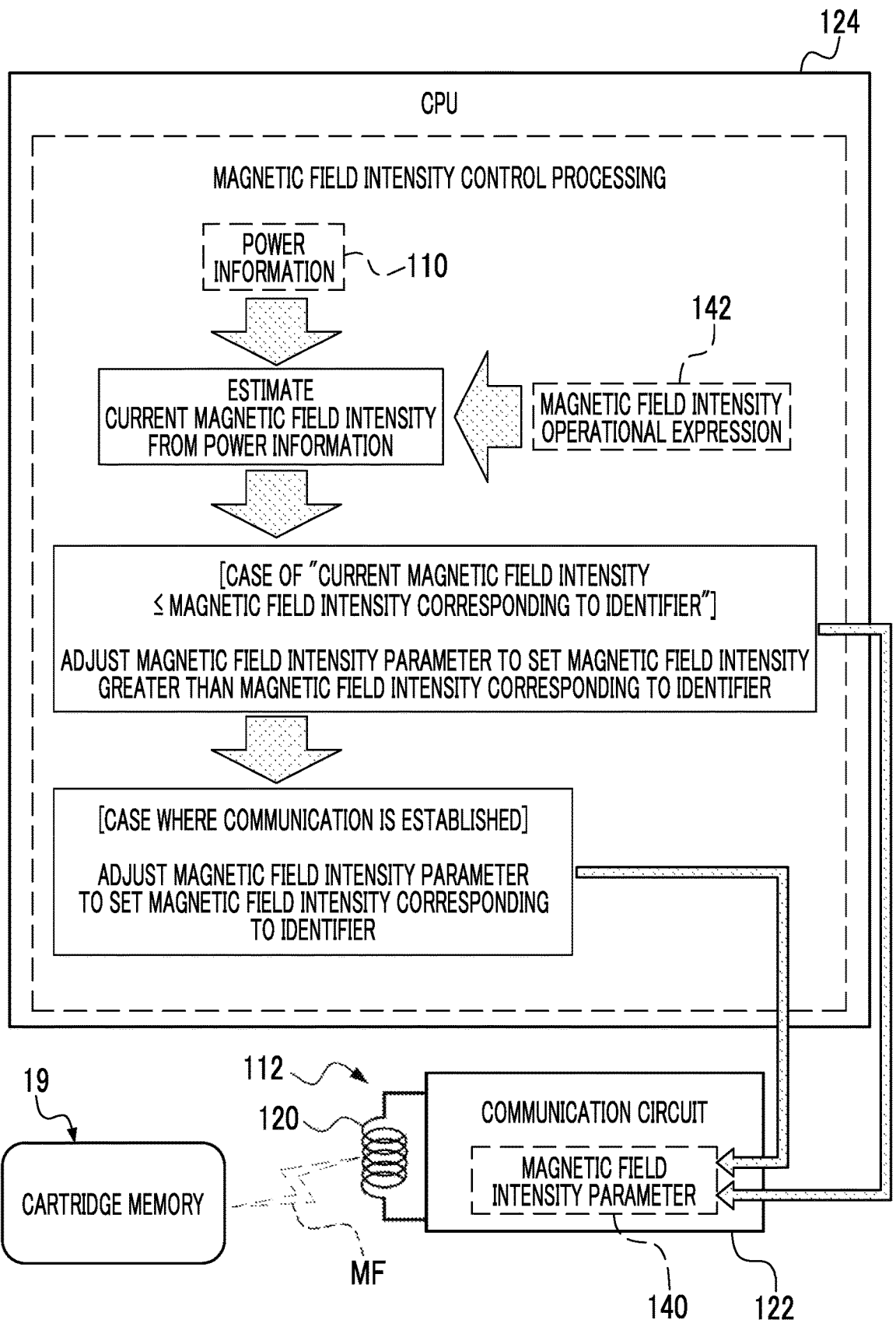
FIG. 22 is a conceptual diagram showing an example of contents of the magnetic field intensity control processing included in the support processing.

As shown in FIG. 22 as an example, in the magnetic field intensity control processing, the CPU 124 estimates the intensity of a current magnetic field MF from the power information 110 acquired from the transmission and reception device 112. The estimation of the intensity of the magnetic field MF is performed using a magnetic field intensity operational expression 142. The magnetic field intensity operational expression 142 is an operational expression having the power information 110 as an independent variable and the intensity of the magnetic field MF as a dependent variable. For this reason, the CPU 124 substitutes the power information 110 into the magnetic field intensity operational expression 142 to calculate the intensity of the current magnetic field MF. Here, while an operational result using the magnetic field intensity operational expression 142 may be set as the intensity of the current magnetic field MF without change, the CPU 124 may estimate the intensity of the current magnetic field MF using a plurality of previous operational results and the latest operational result. In this case, an example of a method of estimating the intensity of the current magnetic field MF is a method using an interpolation method (for example, extrapolation).

Here, although the magnetic field intensity operational expression 142 is illustrated, this is merely an example, and the intensity of the magnetic field MF may be derived (estimated) from a table in which the power information 110 and the intensity of the magnetic field MF are associated with each other on a one-to-one basis. The CPU 124 may estimate the current intensity of the magnetic field MF using a trained machine learning model.

Here, the CPU 124 generates the magnetic field MF with an intensity higher than the intensity determined in advance as the intensity of the magnetic field MF to be applied to the cartridge memory 19. Specifically, in a case where the current intensity of the magnetic field MF estimated from the power information 110 is equal to or lower than the intensity of the magnetic field MF corresponding to the identifier 106, that is, the intensity of the magnetic field MF derived from the magnetic field intensity table 138, the CPU 124 adjusts the magnetic field intensity parameter 140 such that the intensity of the magnetic field MF is set to be greater than the intensity of the magnetic field MF corresponding to the identifier 106. With this, the magnetic field MF with the intensity greater than the intensity of the magnetic field MF corresponding to the identifier 106 is emitted from the antenna coil 120 to the cartridge memory 19.

In this way, in a state in which the magnetic field MF with the intensity greater than the intensity of the magnetic field MF corresponding to the identifier 106 is emitted from the antenna coil 120 to the cartridge memory 19, the CPU 124 establishes communication between the noncontact reading and writing device 50A and the cartridge memory 19. The CPU 124 changes the intensity of the magnetic field MF to a specific intensity in a state in which communication between the noncontact reading and writing device 50A and the cartridge memory 19 is established.

Here, the specific intensity indicates, for example, the intensity of the magnetic field MF corresponding to the identifier 106, that is, the intensity of the magnetic field MF derived from the magnetic field intensity table 138. That is, the CPU 124 adjusts the magnetic field intensity parameter 140 such that the intensity of the magnetic field MF is set to the intensity of the magnetic field MF corresponding to the identifier 106, in a state in which communication between the noncontact reading and writing device 50A and the cartridge memory 19 is established.

In this way, the magnetic field intensity parameter 140 corresponding to the intensity of the magnetic field MF corresponding to the identifier 106, that is, the intensity of the magnetic field MF derived from the magnetic field intensity table 138 is set by the CPU 124, whereby the intensity of the magnetic field MF that is emitted from the antenna coil 120 to the cartridge memory 19 is changed to the intensity of the magnetic field MF corresponding to the identifier 106.

Figure 23:
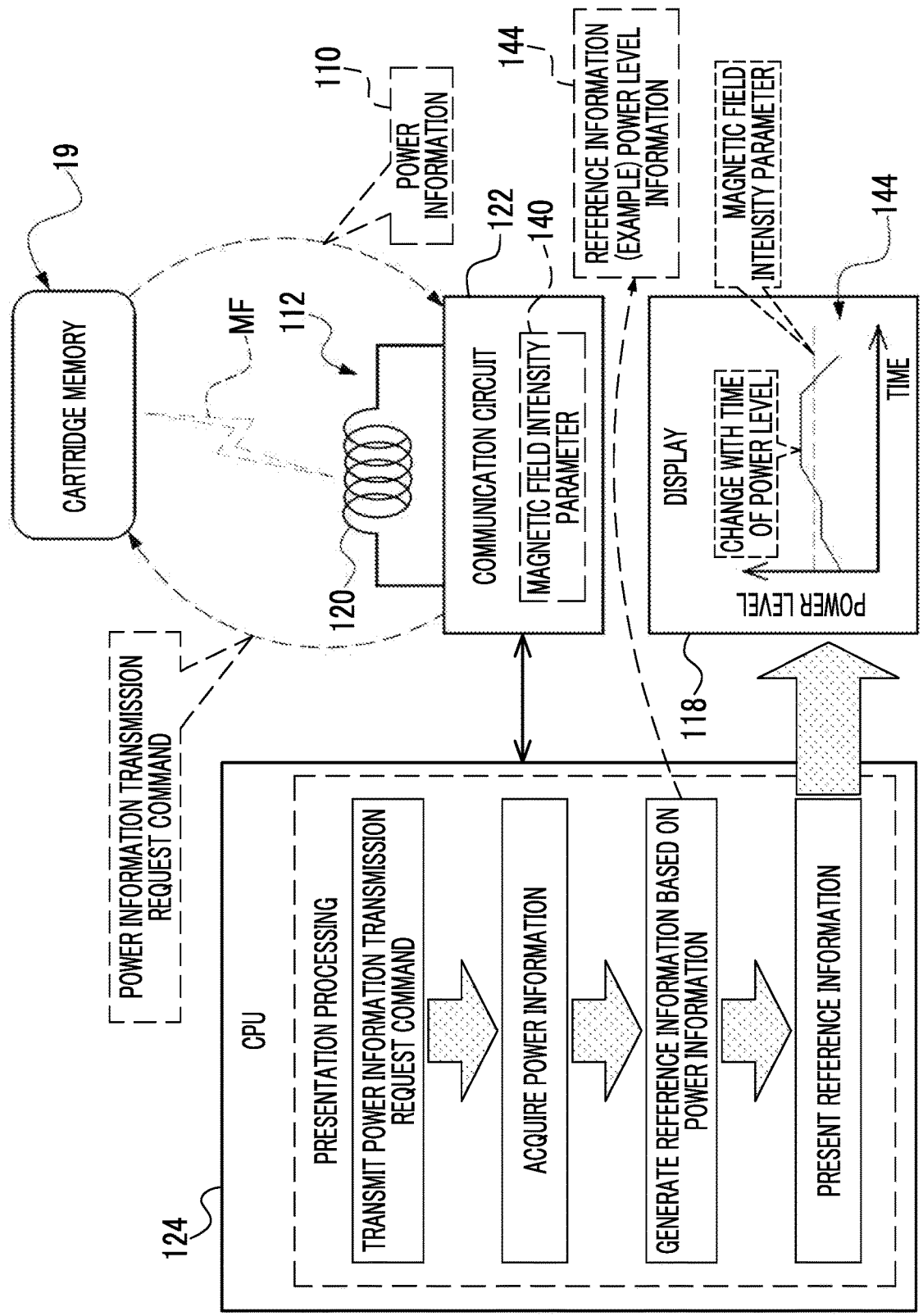
FIG. 23 is a conceptual diagram showing an example of contents of presentation processing included in the support processing.

As shown in FIG. 23 as an example, in the presentation processing, the CPU 124 causes the communication circuit 122 to transmit the power information transmission request command to the cartridge memory 19. Accordingly, the power information 110 is transmitted from the cartridge memory 19 to the transmission and reception device 112. The transmission and reception device 112 receives the power information 110 transmitted from the cartridge memory 19, and the CPU 124 acquires the power information 110 received by the transmission and reception device 112. The CPU 124 generates the reference information 144 based on the power information 110 acquired from the transmission and reception device 112. The reference information 144 is, for example, power level information indicating a level (hereinafter, referred to as a "power level") of power to be specified from the power information 110. In the example shown in FIG. 23, as an example of the reference information 144, a graph capable of comparing a lower limit value of a stable power level with change with time of the power level is shown. The stable power level indicates, for example, a power level at which the above-described predetermined state can be maintained.

The CPU 124 displays the reference information 144 on the display 118. In the example shown in FIG. 23, although an aspect where the graph capable of comparing the lower limit value of the stable power level with the change with time of the power level is displayed on the display 118 has been shown, this is merely an example, and a numerical value indicating the latest power level may be displayed on the display 118 along with the graph or instead of the graph or both the latest power level and the lower limit value of the stable power level may be displayed in numerical values to be comparable on the display 118. In a case where the power level is equal to or greater than the lower limit value of the stable power level, information (for example, an image and/or a message) indicating that the power level is equal to or greater than the lower limit value of the stable power level may be displayed on the display 118, and in a case where the power level falls below the lower limit value of the stable power level, information (for example, an image and/or a message) indicating that the power level falls below the lower limit value of the stable power level may be displayed on the display 118. A way of information presentation is not limited to visible display on the display 118, and information may be presented using a speaker, a vibrator, and/or a printer instead of the visible display on the display 118 or along with the visible display on the display 118.

Next, the operations of the magnetic tape system 2 will be described referring to FIGS. 24 to 28.

Figure 24:
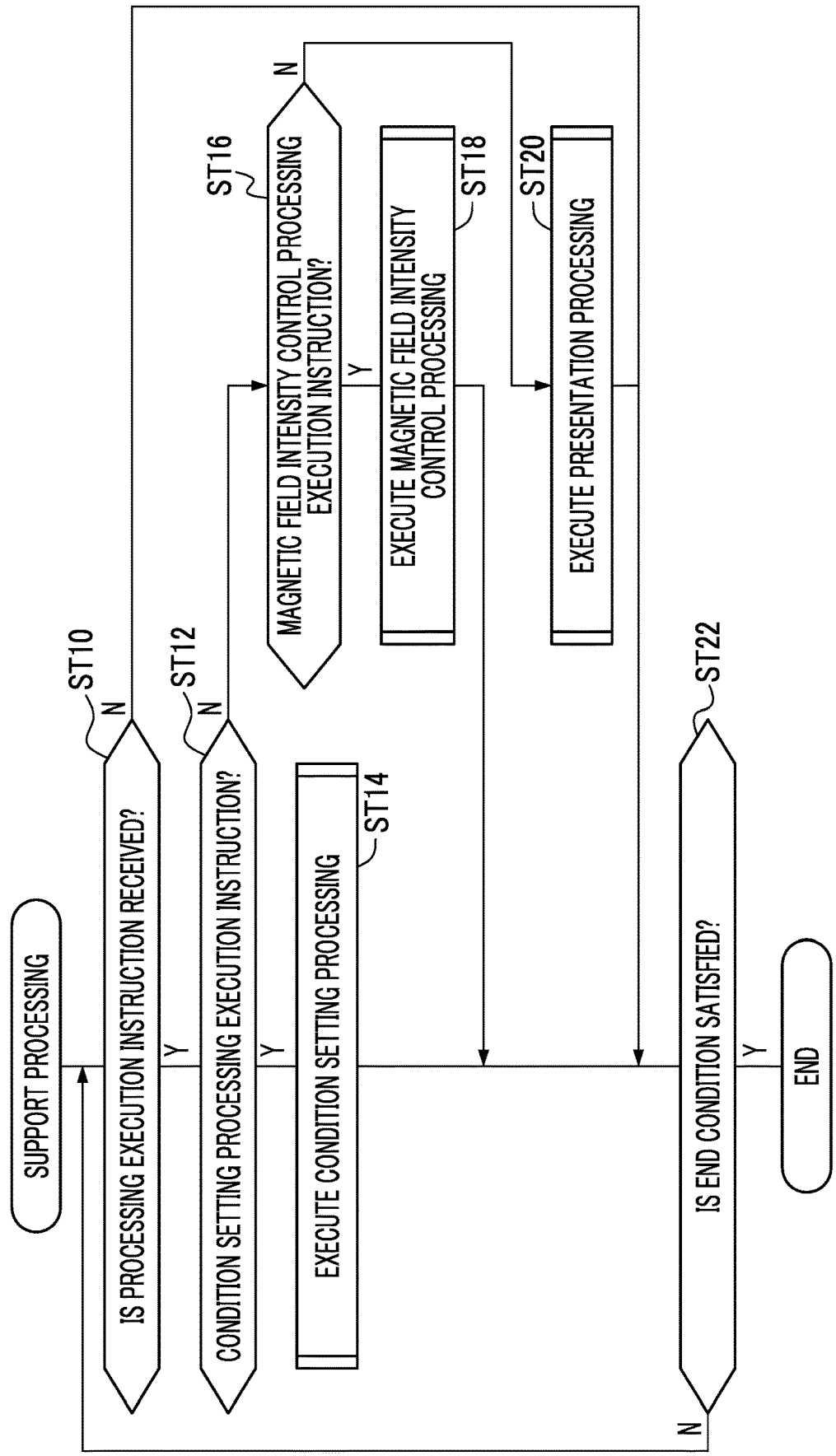
FIG. 24 is a flowchart illustrating an example of a flow of the support processing.

FIG. 24 is a flowchart illustrating an example of a flow of the support processing that is executed by the CPU 124 of the noncontact reading and writing device 50A following the support processing program 136 (see FIGS. 17 and 18). The flow of the support processing shown in FIG. 24 is an example of a "method for operating a noncontact communication device" according to the technique of the present disclosure.

In the support processing shown in FIG. 24, first, in Step ST10, the CPU 124 determines whether or not the processing execution instruction is received by the reception device 116. In Step ST10, in a case where the processing execution instruction is not received by the reception device 116, determination is made to be negative, and the support processing proceeds to Step ST22. In Step ST10, in a case where the processing execution instruction is received by the reception device 116, determination is made to be affirmative, and the support processing proceeds to Step ST12.

In Step ST12, the CPU 124 determines whether or not the processing execution instruction received by the reception device 116 is the condition setting processing execution instruction. In Step ST12, the processing execution instruction received by the reception device 116 is not the condition setting processing execution instruction, determination is made to be negative, and the support processing proceeds to Step ST16. In Step ST12, in a case where the processing execution instruction received by the reception device 116 is the condition setting processing execution instruction, determination is made to be affirmative, and the support processing proceeds to Step ST14.

Figure 25:
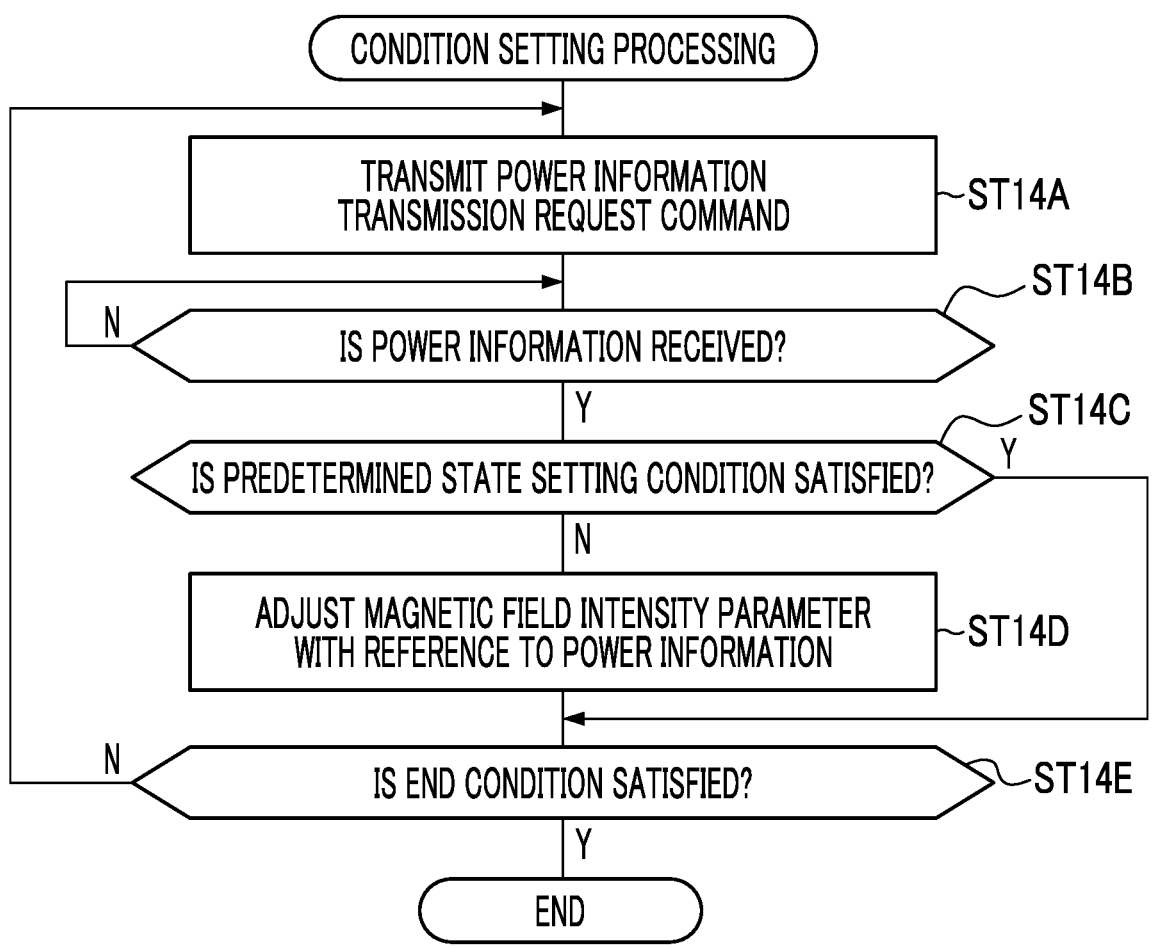
FIG. 25 is a flowchart illustrating an example of a flow of the condition setting processing included in the support processing.

In Step ST14, the CPU 124 executes condition setting processing shown in FIG. 25 as an example, and thereafter, the support processing proceeds to Step ST22.

As shown in FIG. 25 as an example, in the condition setting processing, first, in Step ST14A, the CPU 124 causes the transmission and reception device 112 to transmit the power information transmission request command to the cartridge memory 19, and thereafter, the condition setting processing proceeds to Step ST14B. In a case where the power information transmission request command is transmitted to the cartridge memory 19, the cartridge memory 19 transmits the power information 110 (see Step ST54 of FIG. 28).

In Step ST14B, the CPU 124 determines whether or not the power information 110 is received by the transmission and reception device 112. In Step ST14B, in a case where the power information 110 is not received by the transmission and reception device 112, determination is made to be negative, and the determination of Step ST14B is performed again. In Step ST14B, in a case where the power information 110 is received by the transmission and reception device 112, determination is made to be affirmative, and the condition setting processing proceeds to Step ST14C.

In Step ST14C, the CPU 124 determines whether or not a predetermined state setting condition is satisfied. In Step ST14C, in a case where the predetermined state setting condition is satisfied, determination is made to be affirmative, and the condition setting processing proceeds to Step ST14E. In Step ST14C, in a case where the predetermined state setting condition is not satisfied, determination is made to be negative, and the condition setting processing proceeds to Step ST14D.

In Step ST14D, the CPU 124 acquires the power information 110 received by the transmission and reception device 112, and adjusts the magnetic field intensity parameter 140 to satisfy the predetermined state reaching condition with reference to the acquired power information 110, and thereafter, the condition setting processing proceeds to Step ST14E.

In Step ST14E, the CPU 124 determines whether or not a condition (hereinafter, also referred to as a "condition setting processing end condition") for ending the condition setting processing is satisfied. A first example of the condition setting processing end condition is a condition that a first predetermined time (for example, a time designated in advance within a range of tens of seconds to hundreds of seconds) has elapsed after the execution of the condition setting processing is started. A second example of the condition setting processing end condition is a condition that the number of executions of the processing of Step ST14D reaches a first predetermined number of times (for example, a number of times determined in advance within a range of several times to hundreds of times). A third example of the condition setting processing end condition is a condition that an instruction to end the condition setting processing is received by the reception device 116.

In Step ST14E, in a case where the condition setting processing end condition is not satisfied, determination is made to be negative, and the condition setting processing proceeds to Step ST14A. In Step ST14E, in a case where the condition setting processing end condition is satisfied, determination is made to be affirmative, and the condition setting processing ends.

In the support processing shown in FIG. 24, in Step ST16, the CPU 124 determines whether or not the processing execution instruction received by the reception device 116 is the magnetic field intensity control processing execution instruction. In Step ST16, in a case where the processing execution instruction received by the reception device 116 is not the magnetic field intensity control processing execution instruction (a case where the processing execution instruction received by the reception device 116 is the presentation processing execution instruction), determination is made to be negative, and the support processing proceeds to Step ST20. In Step ST16, in a case where the processing execution instruction received by the reception device 116 is the magnetic field intensity control processing execution instruction, determination is made to be affirmative, and the support processing proceeds to Step ST18.

Figure 26:
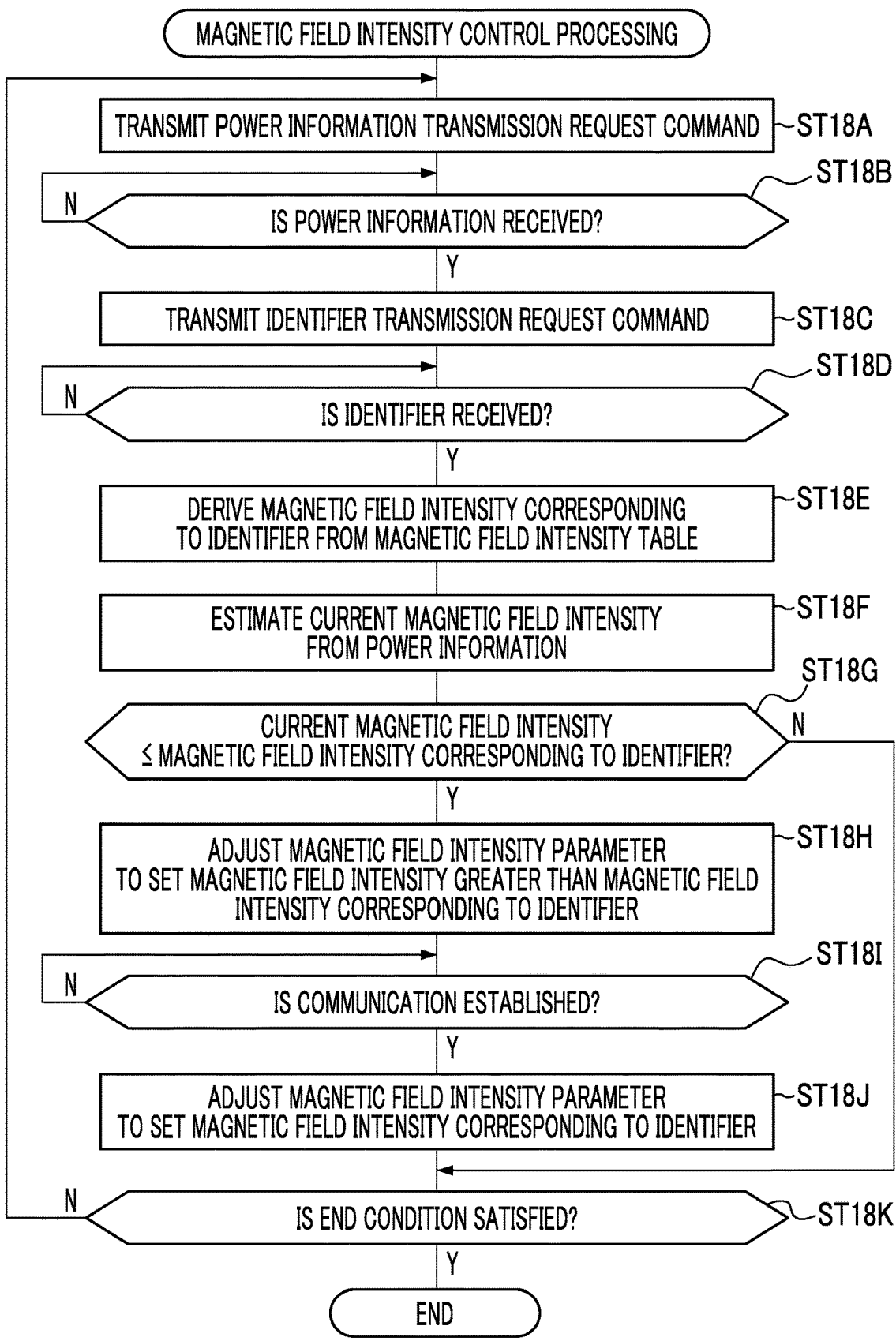
FIG. 26 is a flowchart illustrating an example of a flow of the magnetic field intensity control processing included in the support processing.

In Step ST18, the CPU 124 executes magnetic field intensity control processing shown in FIG. 26 as an example, and thereafter, the support processing proceeds to Step ST22.

As shown in FIG. 26 as an example, in the magnetic field intensity control processing, first, in Step ST18A, the CPU 124 causes the transmission and reception device 112 to transmit the power information transmission request command to the cartridge memory 19, and thereafter, the magnetic field intensity control processing proceeds to Step ST18B. In a case where the power information transmission request command is transmitted to the cartridge memory 19, the cartridge memory 19 transmits the power information 110 (see Step ST54 of FIG. 28).

In Step ST18B, the CPU 124 determines whether or not the power information 110 is received by the transmission and reception device 112. In Step ST18B, in a case where the power information 110 is not received by the transmission and reception device 112, determination is made to be negative, and the determination of Step ST18B is performed again. In Step ST18B, in a case where the power information 110 is received by the transmission and reception device 112, determination is made to be affirmative, and the magnetic field intensity control processing proceeds to Step ST18C.

In Step ST18C, the CPU 124 causes the transmission and reception device 112 to transmit the identifier transmission request command to the cartridge memory 19, and thereafter, the magnetic field intensity control processing proceeds to Step ST18D. In a case where the identifier transmission request command is transmitted to the cartridge memory 19, the cartridge memory 19 transmits the identifier 106 (see Step ST60 of FIG. 28).

In Step ST18D, the CPU 124 determines whether or not the identifier 106 is received by the transmission and reception device 112. In Step ST18D, in a case where the identifier 106 is not received by the transmission and reception device 112, determination is made to be negative, and the determination of Step ST18D is performed again. In Step ST18D, in a case where the identifier 106 is received by the transmission and reception device 112, determination is made to be affirmative, and the magnetic field intensity control processing proceeds to Step ST18E.

In Step ST18E, the CPU 124 derives the intensity (optimum magnetic field intensity) of the magnetic field MF corresponding to the identifier 106 (the identifier 106 received in Step ST18D) received by the transmission and reception device 112 from the magnetic field intensity table 138, and thereafter, the magnetic field intensity control processing proceeds to Step ST18F.

In Step ST18F, the CPU 124 estimates the current intensity of the magnetic field MF from the power information 110 (the power information 110 received in Step ST18B) received by the transmission and reception device 112 using the magnetic field intensity operational expression 142, and thereafter, the magnetic field intensity control processing proceeds to Step ST18G.

In Step ST18G, the CPU 124 determines whether or not the current intensity of the magnetic field MF estimated in Step ST18F is equal to or less than the intensity of the magnetic field MF derived in Step ST18E. In Step ST18G, in a case where the current intensity of the magnetic field MF estimated in Step ST18F is not equal to or less than the intensity of the magnetic field MF derived in Step ST18E, determination is made to be negative, and magnetic field intensity control processing proceeds to Step ST18K. In Step ST18G, in a case where the current intensity of the magnetic field MF estimated in Step ST18F is equal to or less than the intensity of the magnetic field MF derived in Step ST18E, determination is made to be affirmative, and the magnetic field intensity control processing proceeds to Step ST18H.

In Step ST18H, the CPU 124 adjusts the magnetic field intensity parameter 140 such that the intensity of the magnetic field MF is set to an intensity greater than the intensity of the magnetic field MF derived in Step ST18E, and thereafter, the magnetic field intensity control processing proceeds to Step ST18I.

In Step ST18I, the CPU 124 causes the communication circuit 122 to transmit the polling command to the cartridge memory 19. Then, the CPU 124 determines whether or not communication between the noncontact reading and writing device 50A and the cartridge memory 19 is established. In Step ST18I, in a case where communication between the noncontact reading and writing device 50A and the cartridge memory 19 is not established, determination is made to be negative, and the determination of Step ST18I is performed again. In Step ST18I, in a case where communication between the noncontact reading and writing device 50A and the cartridge memory 19 is established, determination is made to be affirmative, and the magnetic field intensity control processing proceeds to Step ST18J.

In Step ST18J, the CPU 124 adjusts the magnetic field intensity parameter 140 such that the intensity of the magnetic field MF is set to the intensity of the magnetic field MF derived in Step ST18E, and thereafter, the magnetic field intensity control processing proceeds to Step ST18K.

In Step ST18K, the CPU 124 determines whether or not a condition (hereinafter, also referred to as a "magnetic field intensity control processing end condition") for ending the magnetic field intensity control processing is satisfied. A first example of the magnetic field intensity control processing end condition is a condition that a second predetermined time (for example, the same time as the first predetermined time) has elapsed after the execution of the magnetic field intensity control processing is started. A second example of the magnetic field intensity control processing end condition is a condition that the number of executions of the processing of Step ST18G reaches a second predetermined number of times (for example, the same number of times as the first predetermined number of times). A third example of the magnetic field intensity control processing end condition is a condition that an instruction to end the magnetic field intensity control processing is received by the reception device 116.

In Step ST18K, in a case where the magnetic field intensity control processing end condition is not satisfied, determination is made to be negative, and the magnetic field intensity control processing proceeds to Step ST18A. In Step ST18K, in a case where the magnetic field intensity control processing end condition is satisfied, determination is made to be affirmative, and the magnetic field intensity control processing ends.

Figure 27:
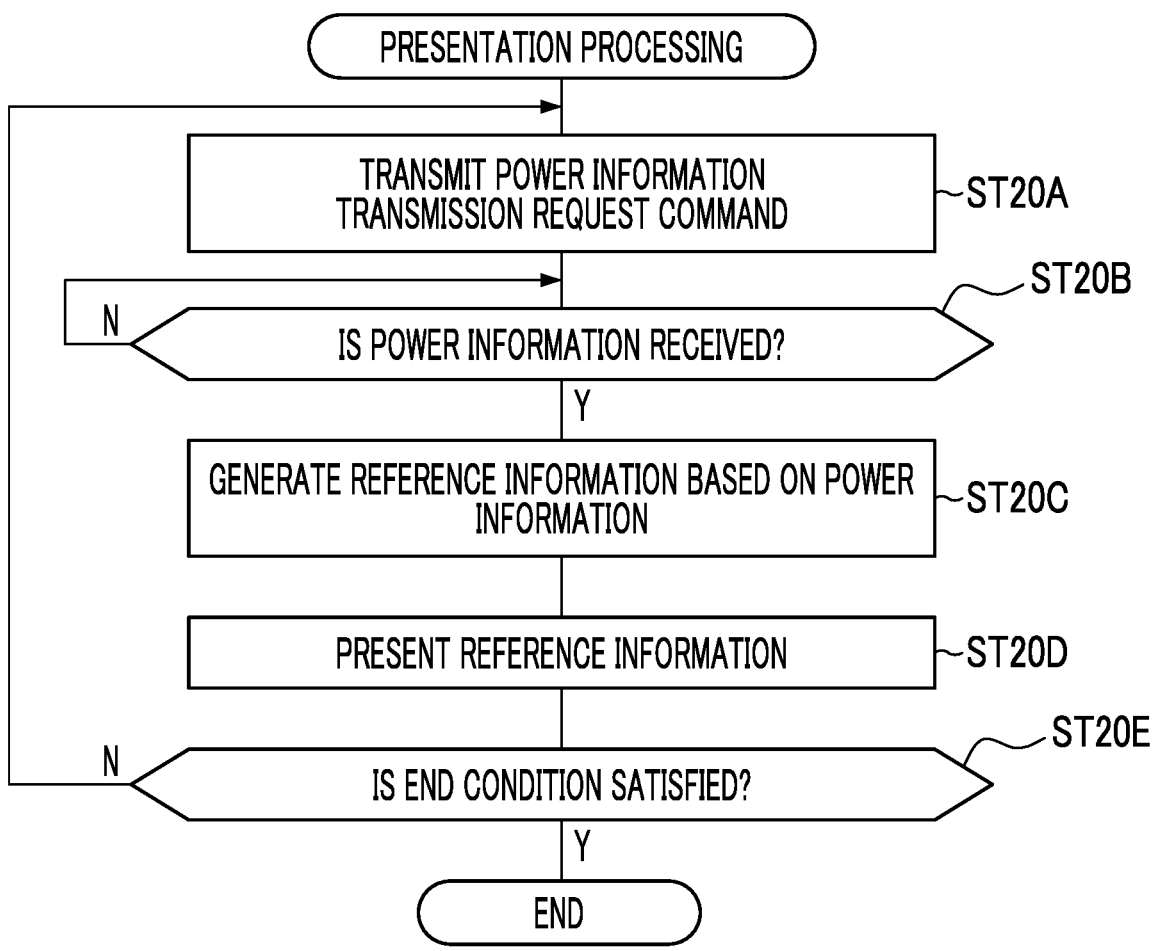
FIG. 27 is a flowchart illustrating an example of a flow of the presentation processing included in the support processing.

In the support processing shown in FIG. 24, in Step ST20, the CPU 124 executes presentation processing shown in FIG. 27 as an example, and thereafter, the support processing proceeds to Step ST22.

As shown in FIG. 27 as an example, in the presentation processing, first, in Step ST20A, the CPU 124 causes the transmission and reception device 112 to transmit the power information transmission request command to the cartridge memory 19, and thereafter, the presentation processing proceeds to Step ST20B. In a case where the power information transmission request command is transmitted to the cartridge memory 19, the cartridge memory 19 transmits the power information 110 (see Step ST54 of FIG. 28).

In Step ST20B, the CPU 124 determines whether or not the power information 110 is received by the transmission and reception device 112. In Step ST20B, in a case where the power information 110 is not received by the transmission and reception device 112, determination is made to be negative, and the determination of Step ST20B is performed again. In Step ST20B, in a case where the power information 110 is received by the transmission and reception device 112, determination is made to be affirmative, and the presentation processing proceeds to Step ST20C.

In Step ST20C, the CPU 124 generates the reference information 144 based on the power information 110 (the power information 110 received in Step ST20B) received by the transmission and reception device 112, and thereafter, the presentation processing proceeds to Step ST20D.

In Step ST20D, the CPU 124 displays the reference information 144 generated in Step ST20C on the display 118, and thereafter, the presentation processing proceeds to Step ST20E.

In Step ST20E, the CPU 124 determines whether or not a condition (hereinafter, also referred to as a "presentation processing end condition") for ending the presentation processing is satisfied. A first example of the presentation processing end condition is a condition that a third predetermined time (for example, the same time as the first predetermined time) has elapsed after the execution of the presentation processing is started. A second example of the presentation processing end condition is a condition that the number of executions of the processing of Step ST20D reaches a third predetermined number of times (for example, the same number of times as the first predetermined number of times). A third example of the presentation processing end condition is a condition that an instruction to end the presentation processing is received by the reception device 116.

In Step ST20E, in a case where the presentation processing end condition is not satisfied, determination is made to be negative, and the presentation processing proceeds to Step ST20A. In Step ST20E, in a case where the presentation processing end condition is satisfied, determination is made to be affirmative, and the presentation processing ends.

In the support processing shown in FIG. 24, in Step ST22, the CPU 124 determines whether or not a condition (hereinafter, also referred to as a "support processing end condition") for ending the support processing is satisfied. A first example of the support processing end condition is a condition that a fourth predetermined time (for example, a time that is longer than the first to third predetermined time and is designated in advance) has elapsed after the execution of the support processing is started. A second example of the support processing end condition is a condition that the total of the numbers of executions of Step ST14, Step ST18, and Step ST20 reaches a fourth predetermined number of times (for example, the same number of times as the first to third predetermined number of times). A third example of the support processing end condition is a condition that an instruction to end the support processing is received by the reception device 116.

In Step ST22, in a case where the support processing end condition is not satisfied, determination is made to be negative, and the presentation processing proceeds to Step ST10. In Step ST22, in a case where the support processing end condition is satisfied, determination is made to be affirmative, and the support processing ends.

Figure 28:
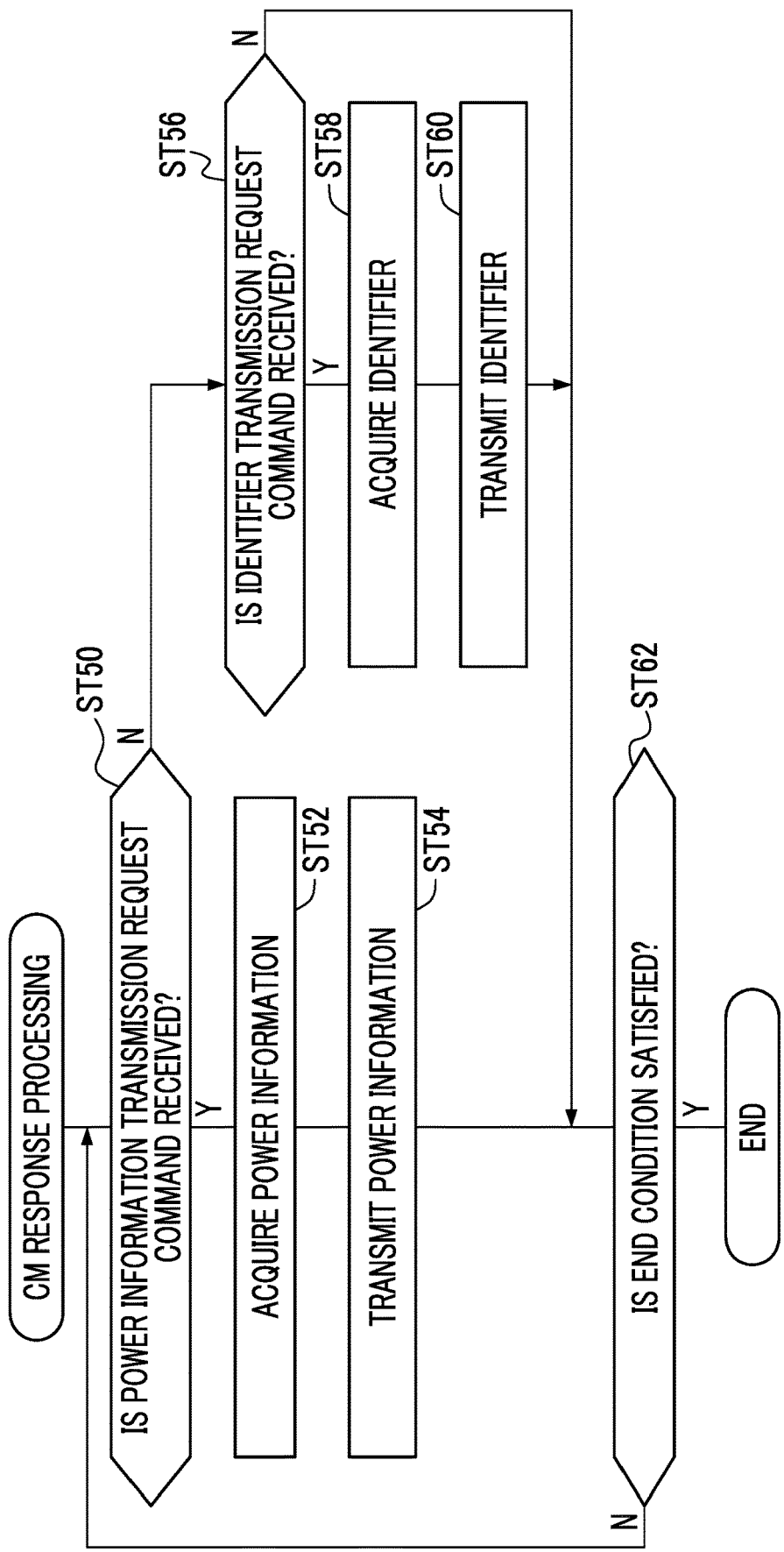
FIG. 28 is a flowchart illustrating an example of a flow of CM response processing.

FIG. 28 is a flowchart illustrating an example of a flow of CM response processing that is executed by the CPU 124 of the noncontact reading and writing device 50A following the CM response processing program 108 (see FIGS. 12 and 13).

In the CM response processing shown in FIG. 28, first, in Step ST50, the communication unit 94B determines whether or not the power information transmission request command transmitted from the noncontact reading and writing device 50A is received by the signal processing circuit 88. In Step ST50, in a case where the power information transmission request command is not received by the signal processing circuit 88, determination is made to be negative, and the CM response processing proceeds to Step ST56. In Step ST50, in a case where the power information transmission request command is received by the signal processing circuit 88, determination is made to be affirmative, and the CM response processing proceeds to Step ST52.

In Step ST52, the acquisition unit 94A acquires the power information 110 from the power measurement circuit 90, and thereafter, the CM response processing proceeds to Step ST54.

In Step ST54, the communication unit 94B transmits the power information 110 acquired in Step ST52 as the response signal to the noncontact reading and writing device 50A through the signal processing circuit 88, and thereafter, the CM response processing proceeds to Step ST62.

In Step ST56, the communication unit 94B determines whether or not the identifier transmission request command transmitted from the noncontact reading and writing device 50A is received by the signal processing circuit 88. In Step ST56, in a case where the identifier transmission request command is not received by the signal processing circuit 88, determination is made to be negative, and the CM response processing proceeds to Step ST62. In Step ST56, in a case where the identifier transmission request command is received by the signal processing circuit 88, determination is made to be affirmative, and the CM response processing proceeds to Step ST58.

In Step ST58, the acquisition unit 94A acquires the identifier 106 from the management information storage block 102, and thereafter, the CM response processing proceeds to Step ST60.

In Step ST60, the communication unit 94B transmits the identifier 106 acquired in Step ST58 as the response signal to the noncontact reading and writing device 50A through the signal processing circuit 88, and thereafter, the CM response processing proceeds to Step ST62.

In Step ST62, the communication unit 94B determines whether or not a condition (hereinafter, also referred to as a "CM response processing end condition") for ending the CM response processing is satisfied. An example of the CM response processing end condition is a condition that an instruction to end the CM response processing is received by the reception device 116. In Step ST62, in a case where the CM response processing end condition is not satisfied, determination is made to be negative, and the CM response processing proceeds to Step ST50. In Step ST62, in a case where the CM response processing end condition is satisfied, determination is made to be affirmative, and the CM response processing ends.

As described above, in the magnetic tape system 2, the power induced in the cartridge memory 19 with the application of the magnetic field MF to the cartridge memory 19 is measured by the power measurement circuit 90, and the power information 110 regarding the measured power is received by the transmission and reception device 112 of the noncontact reading and writing device 50A. Then, the support processing is executed by the CPU 124 of the noncontact reading and writing device 50A based on the power information 110 received by the transmission and reception device 112. The support processing is processing of supporting transmission and reception of information between the cartridge memory 19 and the noncontact reading and writing device 50A. Therefore, according to this configuration, it is possible to contribute to stabilization of transmission and reception of information between the cartridge memory 19 and the noncontact reading and writing device 50A, compared to a case where the support processing based on the power information 110 is not executed.

In the magnetic tape system 2, the condition setting processing is executed as processing included in the support processing by the CPU 124 of the noncontact reading and writing device 50A. The condition setting processing is processing of satisfying the condition for bringing the state of the power in the cartridge memory 19 to the predetermined state, that is, the predetermined state reaching condition based on the power information 110 received by the transmission and reception device 112 of the noncontact reading and writing device 50A. Therefore, according to this configuration, it is possible to contribute to stabilization of transmission and reception of information between the cartridge memory 19 and the noncontact reading and writing device 50A, compared to a case where the state of the power in the cartridge memory 19 is not brought to the predetermined state.

In the magnetic tape system 2, the condition setting processing is executed by the CPU 124 of the noncontact reading and writing device 50A, whereby the state of the power in the cartridge memory 19 is brought to the state in which the operation of the cartridge memory 19 is stable. Therefore, according to this configuration, it is possible to contribute to stabilization of transmission and reception of information between the cartridge memory 19 and the noncontact reading and writing device 50A, compared to a case where the state of the power in the cartridge memory 19 is not brought to the state in which the operation of the cartridge memory 19 is stable.

In the magnetic tape system 2, the condition setting processing is executed by the CPU 124 of the noncontact reading and writing device 50A, whereby the intensity of the magnetic field MF is set to the intensity for bringing the state of the power in the cartridge memory 19 to the predetermined state. Therefore, according to this configuration, it is possible to contribute to stabilization of transmission and reception of information between the cartridge memory 19 and the noncontact reading and writing device 50A, compared to a case where the intensity of the magnetic field MF is not set to the intensity for bringing the state of the power in the cartridge memory 19 to the predetermined state.

In the magnetic tape system 2, the magnetic field intensity control processing is executed as processing included in the support processing by the CPU 124 of the noncontact reading and writing device 50A. The magnetic field intensity control processing is processing of controlling the intensity of the magnetic field MF based on the power information 110 received by the transmission and reception device 112 of the noncontact reading and writing device 50A. Therefore, according to this configuration, it is possible to contribute to stabilization of transmission and reception of information between the cartridge memory 19 and the noncontact reading and writing device 50A, compared to a case where the intensity of the magnetic field MF is not controlled based on the power information 110 at all.

In the magnetic tape system 2, the magnetic field intensity control processing is executed by the CPU 124 of the noncontact reading and writing device 50A, whereby the magnetic field MF is generated with the intensity higher than the intensity (the optimum magnetic field intensity corresponding to the identifier 106) determined in advance as the intensity of the magnetic field MF to be applied to the cartridge memory 19. Therefore, according to this configuration, it is possible to stabilize the operation of the cartridge memory 19, compared to a case where the magnetic field MF is generated with an intensity equal to or less than the intensity determined in advance as the intensity of the magnetic field MF to be applied to the cartridge memory 19.

In the magnetic tape system 2, the magnetic field intensity control processing is executed by the CPU 124 of the noncontact reading and writing device 50A, whereby the magnetic field MF is generated with the intensity higher than the intensity determined in advance as the intensity of the magnetic field MF to be applied to the cartridge memory 19, and as a result, communication between the cartridge memory 19 and the noncontact reading and writing device 50A is established. Then, the intensity of the magnetic field MF is changed to the specific intensity (for example, the optimum magnetic field intensity corresponding to the identifier 106) in a state in which communication between the cartridge memory 19 and the noncontact reading and writing device 50A is established. Therefore, according to this configuration, it is possible to suppress wasteful power consumption, compared to a case where the magnetic field MF is constantly generated with the intensity higher than the intensity determined in advance as the intensity of the magnetic field MF to be applied to the cartridge memory 19.

In the magnetic tape system 2, the magnetic field intensity parameter 140 of the communication circuit 122 is set by the CPU 124 such that the intensity of the magnetic field MF is changed to the specific intensity (for example, the optimum magnetic field intensity corresponding to the identifier 106). Therefore, according to this configuration, it is possible to apply the magnetic field MF of an optimum intensity to the cartridge memory 19, compared to a case where the intensity of the magnetic field MF to be applied to the cartridge memory 19 is strengthened or weakened by adjusting the distance between the cartridge memory 19 and the noncontact reading and writing device 50A.

In the magnetic tape system 2, the reference information 144 based on the power information 110 is displayed on the display 118 by the CPU 124. Therefore, according to this configuration, it is possible to allow the user or the like to recognize the reference information 144 based on the power information 110.

In the magnetic tape system 2, the reference information 144 that is displayed on the display 118 is the power level information indicating the power level to be specified from the power information 110. Therefore, according to this configuration, it is possible to allow the user or the like to recognize the power level to be specified from the power information 110.

In the magnetic tape system 2, information indicating the tendency of fluctuation of the power within the predetermined period is used as the power information 110. Therefore, according to this configuration, compared to a case where the tendency of fluctuation of the power within the predetermined period is not used, it is possible to stabilize transmission and reception of information between the cartridge memory 19 and the noncontact reading and writing device 50A in consideration of the tendency of fluctuation of the power within the predetermined period.

In the magnetic tape system 2, the power information 110 is information defined by the dissimilarity from the relative value of the power or the reference of the power. Therefore, according to this configuration, compared to a case where the power information 110 is not information defined by the dissimilarity from the relative value of the power or the reference of the power, it is possible to stabilize transmission and reception of information between the cartridge memory 19 and the noncontact reading and writing device 50A in consideration of the dissimilarity from the relative value of the power or the reference of the power.

In the above-described embodiment, although the condition setting processing, the magnetic field intensity control processing, and the presentation processing have been illustrated as processing included in the support processing, the technique of the present disclosure is not limited thereto, and storage processing may be included in the support processing. Here, the storage processing is processing of storing information based on the power information 110 in a storage device. An example of information based on the power information 110 is the reference information 144 (see FIG. 23). Here, an example of the storage device is the NVM 126 and/or a memory (for example, a non-transitory storage medium) of an external device (server, personal computer, smart device, or the like) connected to the noncontact reading and writing device 50A to be communicable. The storage device may be the NVM 96 of the cartridge memory 19. In this case, for example, the noncontact reading and writing device 50A may transmit a write-in command for writing the reference information 144 into the NVM 96, to the cartridge memory 19, and the IC chip 52 of the cartridge memory 19 may write the reference information 144 into the NVM 96 in response to the write-in command.

In this way, in a case where the storage processing is executed as processing included in the support processing by the CPU 124, it is possible to contribute to stabilization of transmission and reception of information between the cartridge memory 19 and the noncontact reading and writing device 50A, compared to a case where information based on the power information 110 is not stored in the storage device at all.

In the above-described embodiment, although a form example where the cartridge memory 19 transmits the power information 110 to the noncontact reading and writing device 50A in response to the power information transmission request command transmitted from the noncontact reading and writing device 50A has been described, the technique of the present disclosure is not limited thereto. For example, the cartridge memory 19 may intermittently transmit the power information 110 to the noncontact reading and writing device 50A regardless of a request from the noncontact reading and writing device 50A. In this case, the CPU 124 of the noncontact reading and writing device 50A may execute the support processing each time the power information 110 transmitted from the cartridge memory 19 is received by the transmission and reception device 112.

Figure 29:
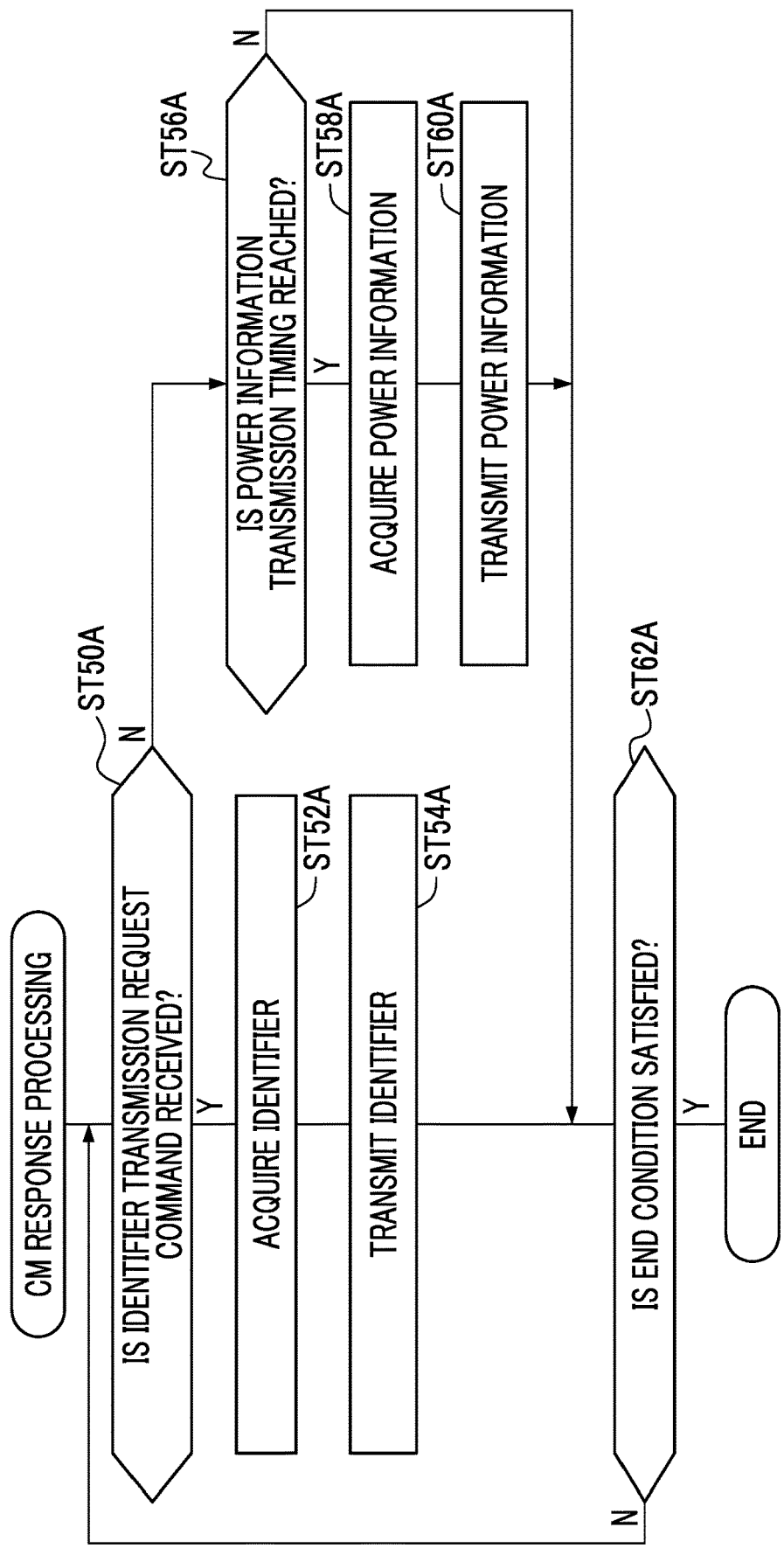
FIG. 29 is a flowchart illustrating a modification example of a flow of CM response processing.

In this way, in a case where the cartridge memory 19 intermittently transmits the power information 110 to the noncontact reading and writing device 50A, for example, the CM response processing shown in FIG. 29 is executed by the CPU 94.

In the CM response processing shown in FIG. 29, in Step ST50A, the communication unit 94B determines whether or not the identifier transmission request command transmitted from the noncontact reading and writing device 50A is received by the signal processing circuit 88. In Step ST50A, in a case where the identifier transmission request command is not received by the signal processing circuit 88, determination is made to be negative, and the CM response processing proceeds to Step ST56A. In Step ST50A, in a case where the identifier transmission request command is received by the signal processing circuit 88, determination is made to be affirmative, and the CM response processing proceeds to Step ST52A.

In Step ST52A, the acquisition unit 94A acquires the identifier 106 from the management information storage block 102, and thereafter, the CM response processing proceeds to Step ST54A.

In Step ST54A, the communication unit 94B transmits the identifier 106 acquired in Step ST52A as the response signal to the noncontact reading and writing device 50A through the signal processing circuit 88, and thereafter, the CM response processing proceeds to Step ST62A.

In Step ST56A, the acquisition unit 94A determines whether or not a power information transmission timing that is a timing of transmitting the power information 110 to the noncontact reading and writing device 50A is reached. A first example of the power information transmission timing is a timing that is reached at every fifth predetermined time (for example, a time designated within a range of several milliseconds to hundreds of milliseconds). A second example of the power information transmission timing is a timing at which an absolute value of an amount of fluctuation (for example, an amount of fluctuation per unit time) of the power (the absolute value of the power, the moving average value of the power, and the dissimilarity from the reference value of the power) measured by the power measurement circuit 90 exceeds a threshold value. The threshold value may be a fixed value or may be a variable value that is changed depending on a given condition and/or a given instruction. That is, the power information transmission timing may be a timing that is reached in every given period or may be a timing that is reached randomly.

In Step ST56A, in a case where the power information transmission timing is not reached, determination is made to be negative, and the CM response processing proceeds to Step ST62A. In Step ST56A, in a case where the power information transmission timing is reached, determination is made to be affirmative, and the CM response processing proceeds to Step ST58A.

In Step ST58A, the acquisition unit 94A acquires the power information 110 from the power measurement circuit 90, and thereafter, the CM response processing proceeds to Step ST60A.

In Step ST60A, the communication unit 94B transmits the power information 110 acquired in Step ST58A as the response signal to the noncontact reading and writing device 50A through the signal processing circuit 88, and thereafter, the CM response processing proceeds to Step ST62A.

In Step ST62A, the communication unit 94B determines whether or not the CM response processing end condition is satisfied. In Step ST62A, in a case where the CM response processing end condition is not satisfied, determination is made to be negative, and the CM response processing proceeds to Step ST50A. In Step ST62A, in a case where the CM response processing end condition is satisfied, determination is made to be affirmative, and the CM response processing ends.

In this way, the CM response processing shown in FIG. 29 is executed, whereby the noncontact reading and writing device 50A can obtain the power information 110 without transmitting the power information transmission request command to the cartridge memory 19.

In the above-described embodiment, although a form example where the magnetic tape drive 30 pulls out the magnetic tape MT from the magnetic tape cartridge 10, records data on the pulled-out magnetic tape MT using the magnetic head 36, and reads data from the pulled-out magnetic tape MT using the magnetic head 36 has been described, the technique of the present disclosure is not limited thereto. For example, a magnetic head (not shown) that performs only recording or reading of data with respect to the magnetic tape MT pulled out from the magnetic tape cartridge 10 may be used.

Figure 30:
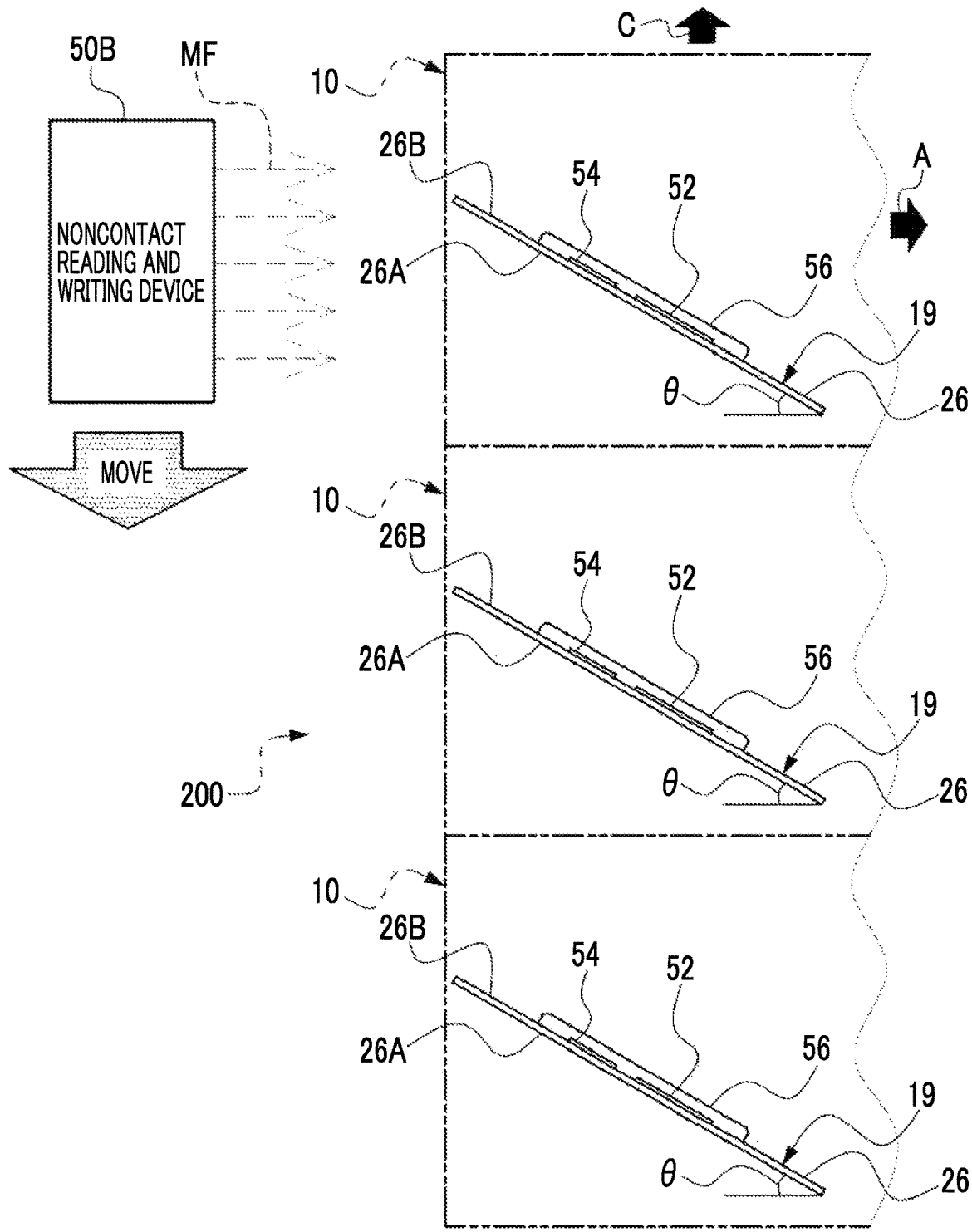
FIG. 30 is a conceptual diagram showing an example of an aspect where a magnetic field is applied to a package of a plurality of magnetic tape cartridges by a noncontact reading and writing device.

In the above-described embodiment, although a form example where the noncontact reading and writing device 50A is mounted in the magnetic tape drive 30 has been shown, the technique of the present disclosure is not limited thereto. In a stage where the magnetic tape cartridge 10 is manufactured, a stage where the magnetic tape cartridge 10 is inspected, or a stage where the magnetic tape cartridge 10 is shipped, as shown in FIG. 30 as an example, a noncontact reading and writing device 50B is used. The noncontact reading and writing device 50B is an example of a "noncontact communication device" according to the technique of the present disclosure, and is, for example, a stationary or portable reader/writer.

In the example shown in FIG. 30, transmission and reception of information are performed between the cartridge memory 19 of each magnetic tape cartridge 10 in a package 200 in which a plurality of magnetic tape cartridges 10 that overlap in an up-down direction are shrunk with a plastic film, and the noncontact reading and writing device 50B. Transmission and reception of information between the cartridge memory 19 and the noncontact reading and writing device 50B are performed while moving the noncontact reading and writing device 50B along a direction in which a plurality of magnetic tape cartridges 10 overlap, on the rear side of the magnetic tape cartridge 10. In this case, for example, the noncontact reading and writing device 50B sequentially emits the magnetic field MF to each of the magnetic tape cartridges 10 while repeating the on and off of the magnetic field MF, thereby performing transmission and reception of information with the cartridge memory 19.

Figure 31:
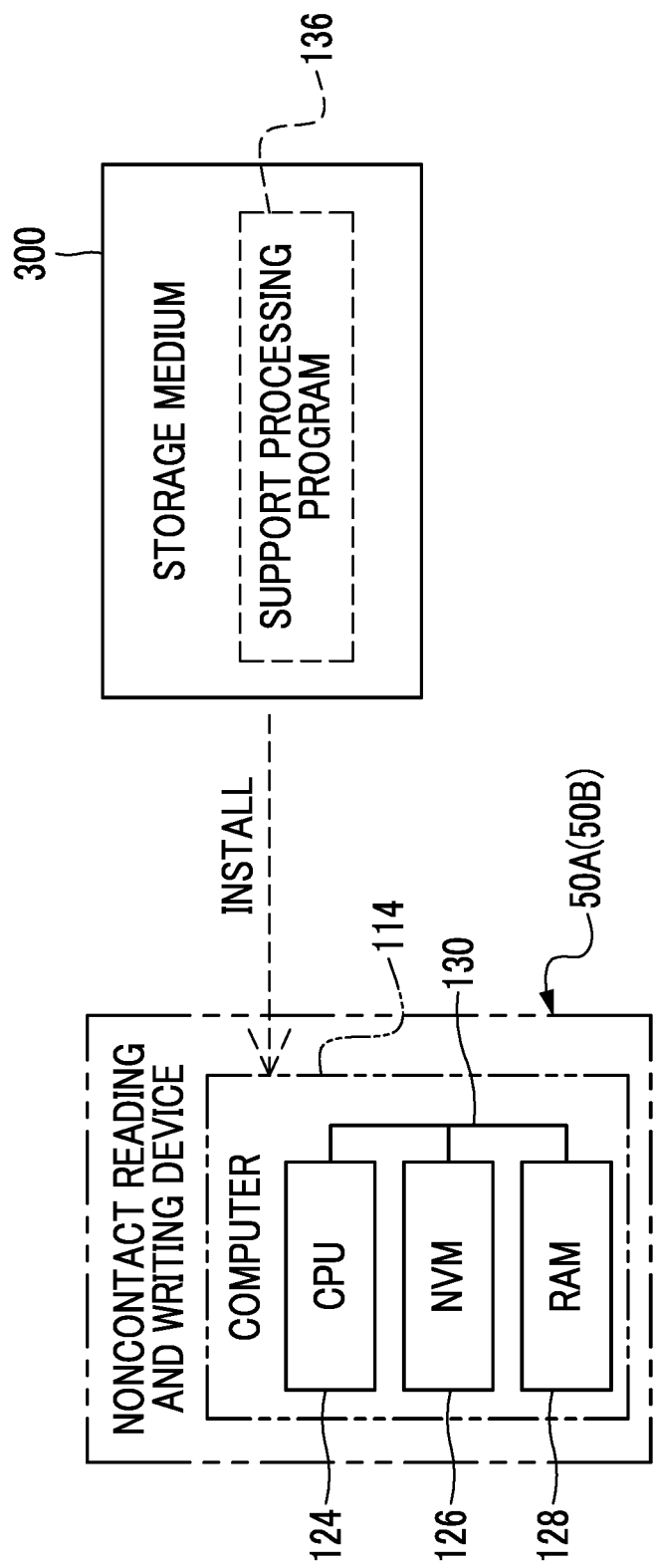
FIG. 31 is a block diagram showing an example of an aspect where the support processing program is installed on a computer of the noncontact reading and writing device from a storage medium.

In the above-described embodiment, although a form example where the support processing program 136 is stored in the NVM 126 has been described, the technique of the present disclosure is not limited thereto. For example, as shown in FIG. 31, the support processing program 136 may be stored in a storage medium 300. The storage medium 300 is a non-transitory storage medium. An example of the storage medium 300 is any portable storage medium, such as an SSD or a USB memory.

The support processing program 136 that is stored in the storage medium 300 is installed on the computer 114. The CPU 124 executes the support processing following the support processing program 136. In an example shown in FIG. 31, the CPU 124 is a single CPU, but may be a plurality of CPUs.

The support processing program 136 may be stored in a storage device of another computer, a server apparatus, or the like connected to the computer 114 through a communication network (not shown), and the support processing program 136 may be downloaded in response to a request from the cartridge memory 19 and may be installed on the computer 114.

In the example shown in FIG. 31, although the computer 114 has been illustrated, the technique of the present disclosure is not limited thereto, and a device including an ASIC, an FPGA, and/or a PLD may be applied instead of the computer 114. Alternatively, a combination of a hardware configuration and a software configuration may be used instead of the computer 114.

As the hardware resource that executes the support processing, various processors described below can be used. Examples of the processors include a CPU that is a general-use processor executing software, that is, a program to function as a hardware resource that executes the support processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor executes the support processing using the memory.

The hardware resource that executes the support processing may be configured with one of various processors or may be configured with a combination of two or more processors (for example, a combination of a plurality of FPGAs or a combination of a CPU and an FPGA) of the same type or different types. The hardware resource that executes the support processing may be one processor.

As an example where the hardware resource is configured with one processor, first, there is a form in which one processor is configured with a combination of one or more CPUs and software, and the processor functions as the hardware resource that executes the support processing. Second, as represented by SoC or the like, there is a form in which a processor that realizes all functions of a system including a plurality of hardware resources executing the support processing with one IC chip is used. In this way, the support processing is realized using one or more of various processors described above as a hardware resource.

In addition, as the hardware structures of various processors, more specifically, an electric circuit into which circuit elements, such as semiconductor elements, are combined can be used. The above-described support processing is merely an example. Accordingly, it is needless to say that unnecessary steps may be deleted, new steps may be added, or a processing order may be changed without departing from the gist.

The contents of the above description and the contents of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the contents of the above description and the contents of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the contents of the above description and the contents of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

In regard to the above embodiment, the following supplementary item is further disclosed.

[Supplementary Note]

A noncontact communication device comprising:

a processor; and a transmission and reception device that applies a magnetic field to a noncontact storage medium mounted in a magnetic tape cartridge to induce power in the noncontact storage medium and is coupled to the noncontact storage medium by electromagnetic induction to perform transmission and reception of information with the noncontact storage medium, in which the noncontact storage medium has a measurement circuit that measures the power, and transmits power information regarding the power measured by the measurement circuit to the noncontact communication device, the transmission and reception device receives the power information, and the processor is configured to execute support processing of supporting the transmission and reception based on the power information received by the transmission and reception device.

What is claimed is:

1. A noncontact communication device comprising:

a processor; and a transmission and reception device that applies a magnetic field to a noncontact storage medium to induce power in the noncontact storage medium and is coupled to the noncontact storage medium by electromagnetic induction to perform transmission and reception of information with the noncontact storage medium, wherein the noncontact storage medium has a measurement circuit that measures the power, and transmits power information regarding the power measured by the measurement circuit to the noncontact communication device, the transmission and reception device receives the power information, the processor is configured to execute support processing of supporting the transmission and reception based on the power information received by the transmission and reception device, and the power information is information indicating a tendency of fluctuation of the power within a predetermined period.

2. The noncontact communication device according to claim 1, wherein the support processing is processing including condition setting processing of satisfying a predetermined state reaching condition for bringing a state of the power to a predetermined state based on the power information received by the transmission and reception device.

3. The noncontact communication device according to claim 2, wherein the predetermined state is a state in which operation of the noncontact storage medium is stable.

4. The noncontact communication device according to claim 2, wherein the predetermined state reaching condition is a condition that an intensity of the magnetic field is an intensity for bringing the state of the power to the predetermined state.

5. The noncontact communication device according to claim 1, wherein the support processing is processing including magnetic field intensity control processing of controlling an intensity of the magnetic field based on the power information received by the transmission and reception device.

6. The noncontact communication device according to claim 5,
wherein the magnetic field intensity control processing is processing of generating the magnetic field with an intensity higher than a predetermined intensity as the intensity of the magnetic field applied to the noncontact storage medium.

7. The noncontact communication device according to claim 6,
wherein the magnetic field intensity control processing is processing of changing the intensity of the magnetic field to a specific intensity in a state in which the magnetic field is generated with the intensity higher than the predetermined intensity to establish communication between the noncontact communication device and the noncontact storage medium.

8. The noncontact communication device according to claim 7,
wherein the processor is configured to set a parameter corresponding to the specific intensity to change the intensity of the magnetic field to the specific intensity.

9. The noncontact communication device according to claim 1,
wherein the support processing is processing including presentation processing of causing a presentation device to present reference information based on the power information received by the transmission and reception device.

10. The noncontact communication device according to claim 9,
wherein the reference information is information indicating a level of the power specified from the power information.

11. The noncontact communication device according to claim 1,
wherein the noncontact communication device is a reader/writer that performs reading and writing with respect to the noncontact storage medium.

12. The noncontact communication device according to claim 1,
wherein the support processing is processing including storage processing of storing information based on the power information in a storage device.

13. A magnetic tape drive comprising:
the noncontact communication device according to claim 1; and
a magnetic head,
wherein the noncontact storage medium is mounted in a magnetic tape cartridge,
the magnetic tape cartridge accommodates a magnetic tape, and
the magnetic head performs at least one of recording or reading of data with respect to the magnetic tape pulled out from the magnetic tape cartridge.

14. A noncontact communication system comprising:
the noncontact communication device according to claim 1; and
the noncontact storage medium.

15. A method for operating a noncontact communication device that applies a magnetic field to a noncontact storage medium to induce power in the noncontact storage medium and is coupled to the noncontact storage medium by electromagnetic induction to perform transmission and reception of information with the noncontact storage medium,
the noncontact storage medium having a measurement circuit that measures the power, and transmitting power information regarding the power measured by the measurement circuit to the noncontact communication device,
the method comprising:
receiving the power information; and
executing support processing of supporting the transmission and reception based on the received power information,
wherein the power information is information indicating a tendency of fluctuation of the power within a predetermined period.

16. A non-transitory computer-readable storage medium storing a program executable by a computer, which is applied to a noncontact communication device that applies a magnetic field to a noncontact storage medium to induce power in the noncontact storage medium and is coupled to the noncontact storage medium by electromagnetic induction to perform transmission and reception of information with the noncontact storage medium, to perform specific processing,
the noncontact storage medium having a measurement circuit that measures the power, and transmitting power information regarding the power measured by the measurement circuit to the noncontact communication device,
the specific processing comprising:
receiving the power information; and
executing support processing of supporting the transmission and reception based on the received power informationm,
wherein the power information is information indicating a tendency of fluctuation of the power within a predetermined period.

17. A noncontact communication device comprising:
a processor; and
a transmission and reception device that applies a magnetic field to a noncontact storage medium to induce power in the noncontact storage medium and is coupled to the noncontact storage medium by electromagnetic induction to perform transmission and reception of information with the noncontact storage medium,
wherein the noncontact storage medium has a measurement circuit that measures the power, and transmits power information regarding the power measured by the measurement circuit to the noncontact communication device,
the transmission and reception device receives the power information,
the processor is configured to execute support processing of supporting the transmission and reception based on the power information received by the transmission and reception device, and
the power information is information defined by dissimilarity from a relative value of the power or a reference value of the power.

18. A noncontact communication device comprising:
a processor; and
a transmission and reception device that applies a magnetic field to a noncontact storage medium to induce power in the noncontact storage medium and is coupled to the noncontact storage medium by electromagnetic induction to perform transmission and reception of information with the noncontact storage medium,
wherein the noncontact storage medium has a measurement circuit that measures the power, and transmits power information regarding the power measured by the measurement circuit to the noncontact communication device, the transmission and reception device receives the power information, the processor is configured to execute support processing of supporting the transmission and reception based on the power information received by the transmission and reception device, the noncontact storage medium intermittently transmits the power information to the noncontact communication device, and the processor is configured to execute the support processing each time the power information is received by the transmission and reception device.

* * * * *